United States Patent
D'Agostini et al.

(10) Patent No.: US 9,683,736 B2
(45) Date of Patent: Jun. 20, 2017

(54) PRECOMBUSTOR SYSTEM AND METHOD FOR COMBUSTION FOR BIOMASS

(71) Applicant: AIR PRODUCTS AND CHEMICALS, INC., Allentown, PA (US)

(72) Inventors: Mark Daniel D'Agostini, Allentown, PA (US); Aleksandar Georgi Slavejkov, Allentown, PA (US); Stephane Bernard Poussou, Jacksonville, FL (US); Xiaoyi He, Orefield, PA (US); Francis Anthony Milcetich, Coopersburg, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 548 days.

(21) Appl. No.: 14/356,336

(22) PCT Filed: Nov. 7, 2012

(86) PCT No.: PCT/US2012/063936
§ 371 (c)(1),
(2) Date: May 5, 2014

(87) PCT Pub. No.: WO2013/070761
PCT Pub. Date: May 16, 2013

(65) Prior Publication Data
US 2015/0000572 A1 Jan. 1, 2015

Related U.S. Application Data

(60) Provisional application No. 61/558,531, filed on Nov. 11, 2011.

(51) Int. Cl.
*F23C 3/00* (2006.01)
*F23D 1/02* (2006.01)
(Continued)

(52) U.S. Cl.
CPC .............. *F23C 3/008* (2013.01); *F23C 6/04* (2013.01); *F23C 6/045* (2013.01); *F23D 1/02* (2013.01);
(Continued)

(58) Field of Classification Search
CPC .. F23C 3/006; F23C 3/008; F23C 5/32; F23D 1/02
See application file for complete search history.

(56) References Cited

U.S. PATENT DOCUMENTS 1,852,968 A 4/1932 Hillhouse
2,455,907 A 12/1948 Slayter
(Continued)

FOREIGN PATENT DOCUMENTS

FR 1065835 A 5/1954
JP 0235887 1/1985
(Continued)

*Primary Examiner* — David J Laux
(74) *Attorney, Agent, or Firm* — Larry S. Zelson

(57) ABSTRACT

A precombustor system (300) including an ignition chamber (301) having a front wall (308), a central axis, a diameter $D_{ic}$, and an outlet (313) configured to discharge a product gas (315). The ignition chamber (301) includes a central ignition oxygen injector (307) configured to inject a first oxygen stream from the front wall (308) substantially parallel to the central axis, and a tangential primary fuel injector (303) configured to inject a primary fuel stream tangential to the central axis at a location an axial distance $X_{pf}$ downstream of the front wall (308). The ratio $X_{pf}/D_{ic}$ is from 0.25 to 4.0. The central axis forms an angle α with a vertical line of less than or equal to about 45 degrees. The trajectory of the primary fuel stream forms an angle θ with a plane that is perpendicular to the central axis of less than or equal to about 20 degrees. A method for combustion is also disclosed.

15 Claims, 29 Drawing Sheets

(51) Int. Cl.
*F23C 6/04* (2006.01)
*F23G 5/24* (2006.01)
*F23L 7/00* (2006.01)

(52) U.S. Cl.
CPC ............... *F23G 5/24* (2013.01); *F23L 7/007* (2013.01); *Y02E 20/344* (2013.01)

(56) References Cited

U.S. PATENT DOCUMENTS

| | | | |
|---|---|---|---|
| 2,614,513 A | 10/1952 | Miller et al. | |
| 2,623,698 A * | 12/1952 | Dickey | F23C 3/008 110/103 |
| 2,843,065 A | 7/1958 | Sifrin et al. | |
| 2,849,967 A | 9/1958 | Kolling | |
| 2,881,719 A | 4/1959 | Sifrin | |
| 2,925,069 A * | 2/1960 | Terpe | F22B 37/146 110/264 |
| 3,119,379 A | 1/1964 | Sweeney | |
| 5,014,631 A * | 5/1991 | Ikeda | F23C 3/008 110/264 |
| 6,910,432 B2 | 6/2005 | D'Agostini et al. | |
| 6,968,791 B2 | 11/2005 | D'Agostini et al. | |
| 2005/0287487 A1 * | 12/2005 | Hoke, Jr. | F23C 7/02 431/252 |
| 2012/0023823 A1 | 2/2012 | D'Agostini | |

FOREIGN PATENT DOCUMENTS

| | | |
|---|---|---|
| JP | S6017611 A | 1/1985 |
| JP | 08152106 | 6/1996 |
| JP | 08270906 | 10/1996 |
| JP | 11118123 | 4/1999 |
| JP | 3142680 | 6/2008 |
| JP | 2010185631 A | 8/2010 |
| JP | 2011007478 A2 | 1/2011 |
| WO | 2008151271 A1 | 12/2008 |
| WO | 2009031881 A1 | 3/2009 |

* cited by examiner

Fig. 25: Velocity Field

PRECOMBUSTOR SYSTEM AND METHOD FOR COMBUSTION FOR BIOMASS

CROSS-REFERENCE TO RELATED APPLICATIONS

This application claims priority to and benefit of U.S. Provisional Patent Application No. 61/558,531, filed Nov. 11, 2011, which is hereby incorporated by reference in its entirety.

The subject matter of the instant invention is related to copending and commonly assigned U.S. patent application Ser. Nos. 12/845,826 and 12/845,879, filed respectively, Jul. 29, 2010. The disclosure of these patent applications is hereby incorporated by reference.

BACKGROUND OF THE INVENTION

The subject matter of this invention relates to combustion systems and methods. In particular, the present invention is directed to systems and methods for combusting moisture-ladened fuels, such as biomass, in steam generating boilers.

Pulverized coal is a conventional fuel for furnaces or steam generating boilers. It is desirable to replace or supplement pulverized coal with substitute fuels in certain circumstances. Pulverized coal typically has a mass mean particle size of the order of 30-40 microns that allows it to substantially completely burn in suspension in the 1-2 seconds of residence time in the combustion zone. However, many substitution fuels, such as various biomass fuels, cannot be ground as finely as coal; with the result that mean particles sizes are of the order of 1 mm (1000 microns), with many particles as large as several mm. Combustion of these larger substitute fuels is typically both unstable and incomplete. Moreover, most of these fuels have higher moisture content and lower specific energy content than coal and, hence, are not capable of generating a high enough flame temperature to maintain the design heat transfer of the boiler system. Costly de-rates in boiler steam output are thus incurred.

Other solid fuels, such as petroleum coke, for example, have very low volatile content and, hence, these fuels are very difficult to ignite within the short period normally allotted for this purpose in conventional in-flight combustion systems. Finally, in some cases, it is desirable to forego the step of pulverization of coal and thus reduce both capital equipment and power costs associated with this preparatory step. In such cases, the instant invention provides a means of achieving complete combustion in conventional boilers and furnaces with the larger particle size. Modeling has shown that flame stability and complete in-flight combustion of such relatively large and high moisture substitute fuels can be achieved through the pre-liberation of moisture and preheating of fuel particles prior to injection into a furnace or boiler. When such particle pre-heating and drying is enhanced with oxygen, the result is not only stable and complete combustion, but also raising of flame temperatures and restoration of design boiler heat transfer rates. Attempts to date of utilizing these non-conventional fuels as the sole energy source in furnaces or boilers designed for conventional in-flight combustion have largely resulted in incomplete; i.e., inefficient and/or dangerously unstable combustion. As such, most commercial applications of in-flight combustion where non-conventional fuels are utilized have been accomplished with only fractional amounts of the total energy being supplied by the alternative fuel.

Tangential or cyclonic burners have been employed in the past to attempt to solve the problem of drying, devolatilization and combustion of solid fuels. Morgan et al. (Morgan, D., Biffin, M., No, S. Y., and N. Syred, "An Analysis of the Behavior of Non-Slagging, Coal Fired, Cyclone Combustors Using a Phenomenological Model", Twenty Second Symposium (International) on Combustion/The Combustion Institute, 1988, pp. 175-182) describes an air-fuel, non-slagging (i.e., one in which the solid fuel residue does not melt within the reactor) cyclone reactor for combustion of solid fuel in which the solid fuel residue is discharged from a separate conduit than the gaseous products of solid fuel combustion. However, testing showed large percentages of unburned fuel leaving with the solid residue stream under the relatively low-temperature conditions needed to prevent fuel slagging. See FIG. 3 of Morgan et al. which indicates a steep decrease in carbon burnout for particle diameter greater than 500 microns (½ mm). This is an inherent limitation of the solid/gaseous separation that occurs in the Morgan et al. device. Sarv et al. in International Application No. WO2008/151271, D'Agostini et al. in U.S. Pat. No. 6,910,432, U.S. Pat. No. 6,968,791 and D'Agostini in U.S. Patent Application Publication No. 2012/023823, each of which are hereby incorporated by reference in their entirety, disclose an oxygen-enriched slagging cyclone combustor in which a molten solid residue (slag) and gaseous products of combustion are discharged in separate streams from the combustor. The U.S. Pat. No. 6,968,791 patent and the US 2012/023823 application also comprise injection of secondary fuel with oxygen along the main axis of the cyclonic reactor. Slayter in U.S. Pat. No. 2,455,907, which is hereby incorporated by reference in its entirety, discloses a melting apparatus for forming glass fibers in which a solid glass batch material is fed vertically downward along the axis of the melter. An air-fuel gas mixture is injected at the top of the apparatus to create a swirling flame that heats and melts the glass batch material. Both the gaseous products of air-gas combustion and the molten glass fall downward into a converging conical section from which they are discharged into a forehearth for glass refining to be accomplished.

None of the prior art references discuss the criticality of the dimensional proportion of the features within the reaction chamber nor, in particular, the unique and necessary flow field resulting from adherence to the requisite proportions. In fact, the dimensional proportions of the features within the reaction chamber are of very low criticality for the Morgan et al. device, the devices disclosed in WO2008/151271, the device disclosed in U.S. Pat. No. 6,910,432, the device disclosed in U.S. Pat. No. 6,968,791, and US 2012/023823. This is because the separation of solid and gaseous phases taking place within the respective devices de-couples the fluid motion of the gaseous and solid phases. The dimensional proportion of the features within the melting apparatus are not highly critical either within the U.S. Pat. No. 2,455,907 because the glass fibers melt along the walls of the melting apparatus and the molten material flows naturally under the action of gravity toward a bottom discharge port. Moreover, there is no reference to the importance of the relative dimensions among the discharge opening, the apparatus (melting chamber) diameter and the flow properties within the device.

A system and method for liberating moisture from and combusting solid fuel having relatively high moisture contents that is efficient and has high-flame stability and complete in-flight combustion would be desirable in the art.

BRIEF SUMMARY OF THE INVENTION

The instant invention solves problems in this art by permitting usage of an alternative solid fuel into a furnace or steam-generating boiler designed for pulverized coal combustion. The instant invention relates to an oxy/solid fuel precombustor system that comprises a chamber for preheating and drying particles, and initiating particle devolatilization and combustion prior to injection into a furnace or boiler. Fuel is injected tangentially into the ignition chamber where a swirl is formed or maintained. Axially injected oxygen provides a highly reactive atmosphere for igniting finer particles and volatile matter within the core of the ignition chamber, while also generating important secondary flows that establish larger residence times than could be achieved solely with tangential flow. The injector is capable of being inserted into an air/fuel burner, making it particularly convenient for coal to biomass retrofits or co-firing scenarios. Oxygen nozzles used for axial and/or tangential injection can be circular in cross-section or slotted for improved mixing and stronger momentum transfer to the swirling solid fuel flow.

An aspect of the invention relates to a precombustor system including an ignition chamber having a front wall, a central axis, a diameter $D_{ic}$, and an outlet configured to discharge a product gas. The ignition chamber includes a central ignition oxygen injector configured to inject a first oxygen stream from the front wall substantially parallel to the central axis, and a tangential primary fuel injector configured to inject a primary fuel stream tangential to the central axis at a location an axial distance $X_{pf}$ downstream of the front wall. The ratio $X_{pf}/D_{ic}$ is from 0.25 to 4.0. The central axis forms an angle α with a vertical line and the magnitude of the angle α is less than or equal to about 45 degrees. The trajectory of the primary fuel stream forms an angle Θ with a plane that is perpendicular to the central axis and wherein the magnitude of the angle Θ is less than or equal to about 20 degrees.

Another aspect of the invention includes a method for combustion, the method including a step of providing an ignition chamber having a front wall, a central axis, a diameter $D_{ic}$, and an outlet configured to discharge a product gas. A first oxygen stream is injected from the front wall substantially parallel to the central axis from a central ignition oxygen injector. A primary fuel stream is injected tangential to the central axis at a location an axial distance $X_{pf}$ downstream of the front wall from a tangential primary fuel injector. The ratio $X_{pf}/D_{ic}$ is from 0.25 to 4.0. The central axis forms an angle α with a vertical line and the magnitude of the angle α is less than or equal to about 45 degrees. The trajectory of the primary fuel stream forms an angle Θ with a plane that is perpendicular to the central axis and wherein the magnitude of the angle Θ is less than or equal to about 20 degrees.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

Wherever possible, the same reference numbers will be used throughout the drawings to represent the same parts.

DETAILED DESCRIPTION OF THE INVENTION

Provided is a precombustor system and method that liberates moisture from and combusts solid fuel having relatively high moisture content and particle size, enabling high combustion efficiency and high flame stability. In one embodiment, a system and method for combusting biomass for utility boilers is disclosed. In certain embodiments, the precombustor system can replace the fuel nozzle of an existing air-pulverized coal burner, and accomplish the pre-drying, moisture liberation, early volatilization, ignition and combustion of biomass and other substitution fuels so essential to facilitating co-firing and fuel switching without loss of heat transfer or steam generating capacity.

Both the objective and configuration of the instant invention differ in key aspects from prior art. The fact that the instant invention is a non-slagging (i.e., non-melting) reactor in which the solid and gaseous products discharge from the same port requires special attention to the two-phase particle motion within the reaction chamber. In particular, it is advantageous to ensure the continuous suspension of the solid fuel particles in gas flow throughout the path through the system, since the absence thereof would lead to settling of the larger particles on the walls of the chamber. This would subsequently lead to detrimental outcomes such as formation of piles that further impede the desired gas/solid flow patterns, burning of the material on the walls of the chamber, which for many fuels of practical interest will lead to high temperature failure of the device, and finally, intermittent pickup or re-entrainment of particles leading to pulsating or unstable combustion. The instant invention circumvents the aforementioned undesirable outcomes related to natural tendencies of the two-phase gas/solid flow field through its unique geometric configuration coupled with the strategic use of oxygen.

Figure 1:
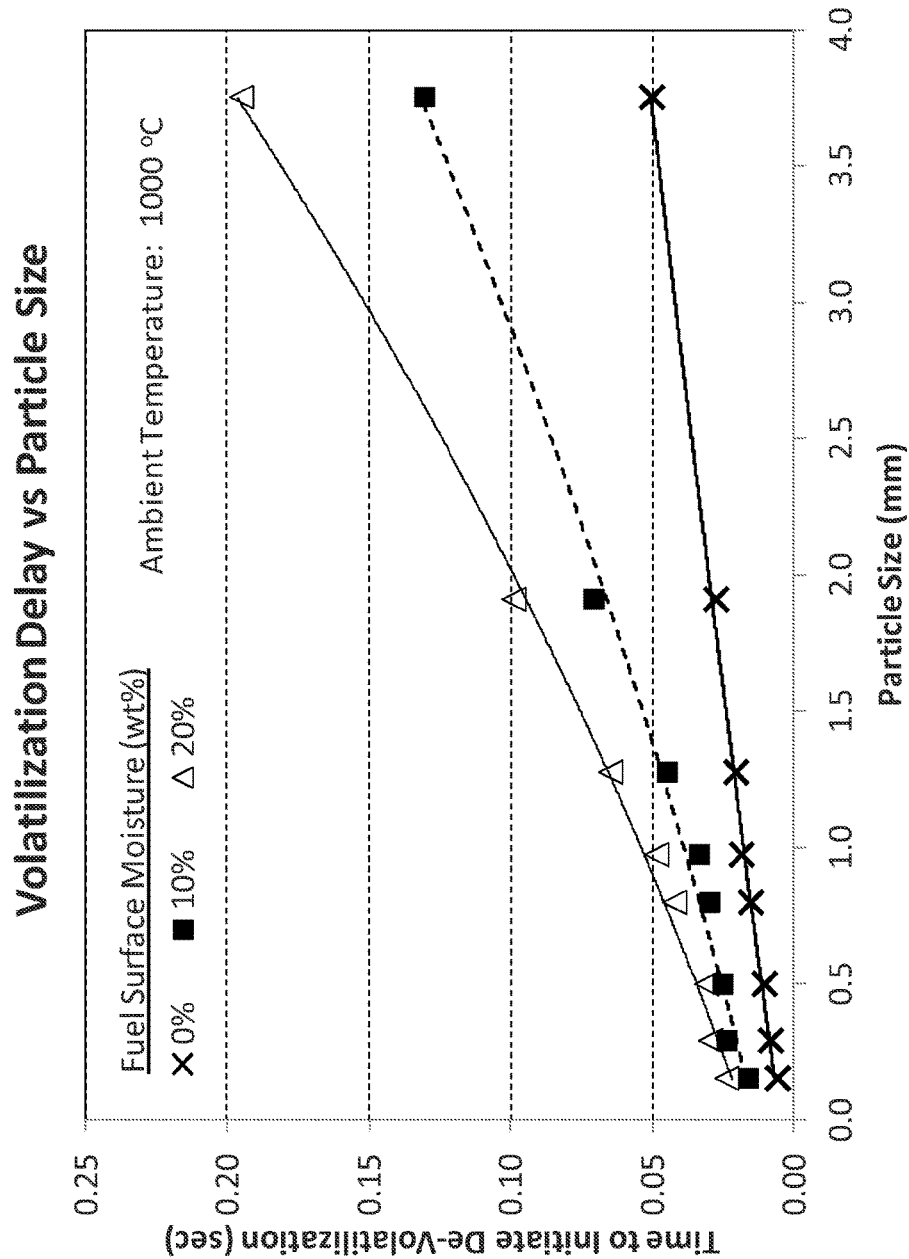
FIG. 1 is a graphical representation of particle size v. time required to de-volatilize wood.

Efficient combustion of solid fuels having substantial moisture and/or large particle size within a boiler/furnace requires completion of the individual steps of drying, heating, volatilization, particle ignition and combustion. A key step in this process is the evolution of volatile matter. Specifically, in conventional prior art in-flight solid fuel combustion systems, the volatile matter is preferably largely evolved very close to (i.e., slightly downstream of) the point of fuel injection into the furnace, since the subsequent ignition of volatile matter drives the early ignition and rapid combustion of the balance of solid fuel. However, volatiles evolution must be preceded by drying of fuel surface moisture and particle heating, which are time-limiting steps in the chain of events. Computational Fluid Dynamics (CFD) modeling using the FLUENT software package was employed to predict the sensitivity of the times required for particle drying and moisture liberation as a function of initial particles size and moisture content, as illustrated in FIG. 1. The model assumes that volatilization of the fuel (wood in this case) is initiated at a fuel particle temperature of 127° C. The particles are assumed to be at 20° C. at time equal to zero, at which point they are exposed to a radiant temperature of 1000° C. Note that the time required for initiation of volatiles evolution increases sharply with both particle size and fuel surface moisture.

As an illustration of the importance of this so-called volatilization delay (i.e., the elapsed time between particle injection and evolution of volatiles), consider solid fuel being ejected from a burner to a furnace at a speed of 100 ft/sec, which is typical. At this speed, a volatilization delay of 10 msec (corresponding to a 0.5 mm particle with no surface moisture) will lead to an ignition delay, or standoff distance, of nominally 1 ft (100 ft/sec×0.01 sec) from the burner nozzle, while a volatilization delay of 100 msec (2 mm particle, 20% surface moisture) has an ignition delay, or standoff distance, of nominally 10 ft (100 ft/sec×0.1 sec).

Figure 2:
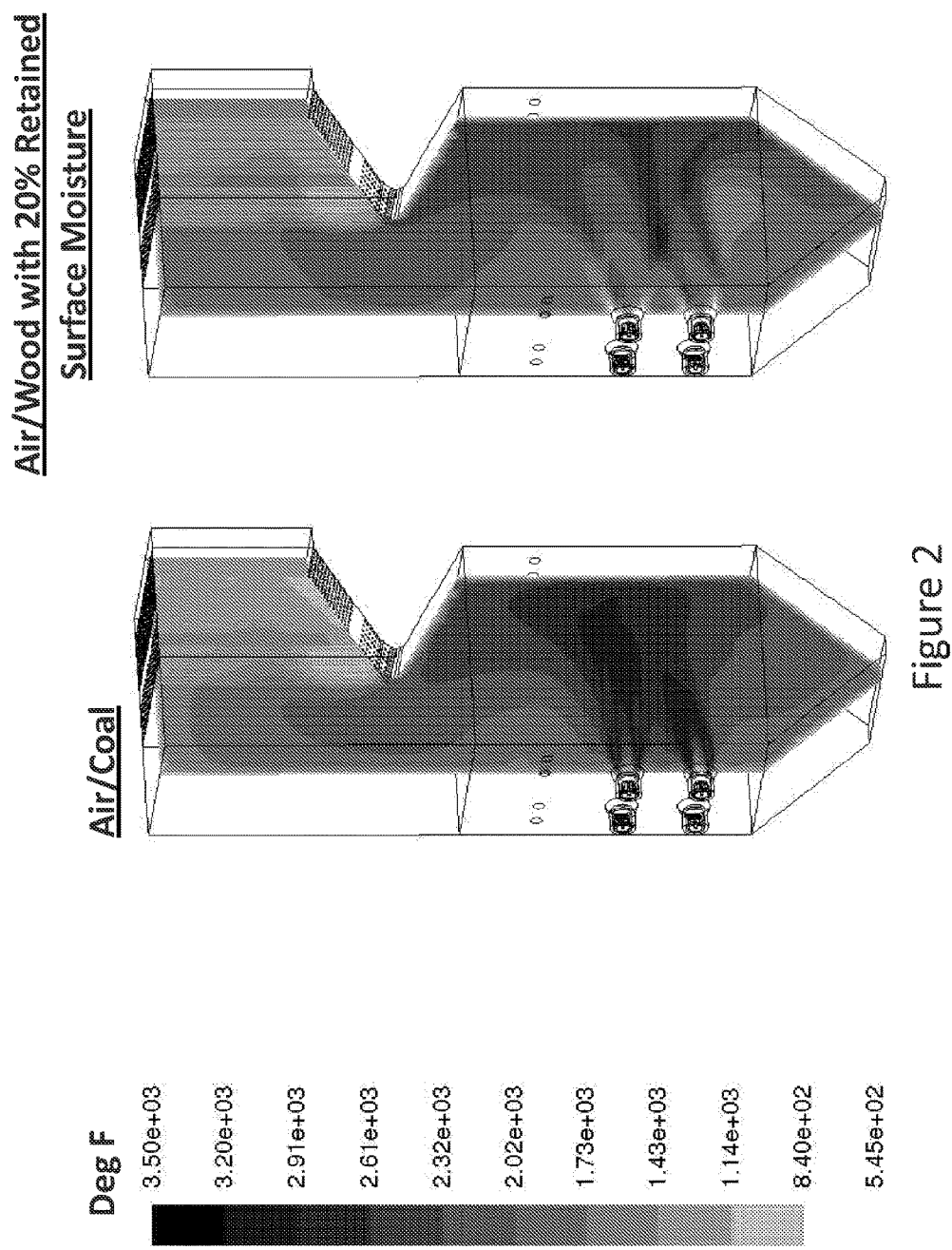
FIG. 2 is an illustration of CFD modeling of a combustion chamber comparing coal and wood.

The profound effect that the combination of pre-drying and volatiles release has on in-flight (suspension-firing, entrained flow) combustion is seen via the CFD modeling of air/fuel combustion of wood particles in a steam-generating boiler, as depicted in FIG. 2. This figure compares the boiler temperature distribution produced via conventional entrained flow combustion of pulverized bituminous coal versus that of wood particles having a mass mean diameter equal to 0.8 mm and 20% surface moisture. FIG. 2 shows the high temperatures in the vicinity of the burner nozzle and subsequent well-defined flame structure for the pulverized coal case and, by comparison, the relatively low temperature around the burner nozzle for the 20% moisture/wood case, leading to a largely detached and incoherent flame structure. It will be appreciated by those skilled in the art that the former case is characterized by flame stability, early solid fuel ignition and essentially complete combustion, while the latter is associated with unstable combustion, poor process control and relatively large percentages of unburned fuel. Further, since residence times available for complete burnout of solid fuel in industrial furnaces are generally of the order of 1 second, such large volatilization/ignition delays are known to be untenable in such processes. The instant precombustor invention facilitates the release of fuel volatilizes and initiates solid fuel combustion prior to injection into the furnace, which thereby increases the effectiveness of industrial furnaces to use biomass or other relatively large and moisture-ladened combustible material as a fuel.

Unless otherwise specified, "oxygen" is defined herein as an oxidizer or oxidant stream with greater than 30 vol % $O_2$, or greater than 60 vol % $O_2$, or greater than about 85 vol % $O_2$ or about 100% $O_2$. "Oxygen-enriched air" is defined herein as "oxygen" combined with air so that the composite oxygen concentration is greater than the oxygen concentration of air alone or equal to or greater than about 22 vol %.

For purposes of this invention, the terms "cyclonic" and "swirl" are used interchangeably and are intended to describe the flow pattern of fuel, gases, oxidant and particles (e.g., within the ignition chamber). "Cyclonic" and "swirl" flow patterns include a rotation of fuel, gases, oxidant and particles in a generally circular or spiral-like motion within a chamber.

Unless otherwise specified, a "furnace" is a chamber into which fuel is injected and combusted to accomplish a specific industrial purpose such as heating, melting, steam generation or incineration or the like. A "boiler" is a type of furnace in which steam is generated.

Primary fuel, as it relates to the instant invention, can be either a solid fuel or a liquid fuel. Examples of possible solid primary fuels comprise at least one of crushed coal or biomass, such as wood chips, saw dust, grass, among other combustible moisture-ladened materials that are not ground to a fine dust prior to combustion. The primary fuel can also be a liquid fuel, particularly a fuel difficult to atomize or ignite, such as glycerol, black liquor or heavy fuel oil, or slurries including both liquid and solids. Having listed possible candidate primary fuels, it is noted that this list is neither complete, nor should it be limiting. Moreover, a preferred embodiment of the invention considers the primary fuel to be one of the solid fuels listed in this paragraph.

Transport gas, as it relates to this invention, includes air, nitrogen, oxygen-enriched air, recirculated products of combustion or combinations thereof.

Figure 3:
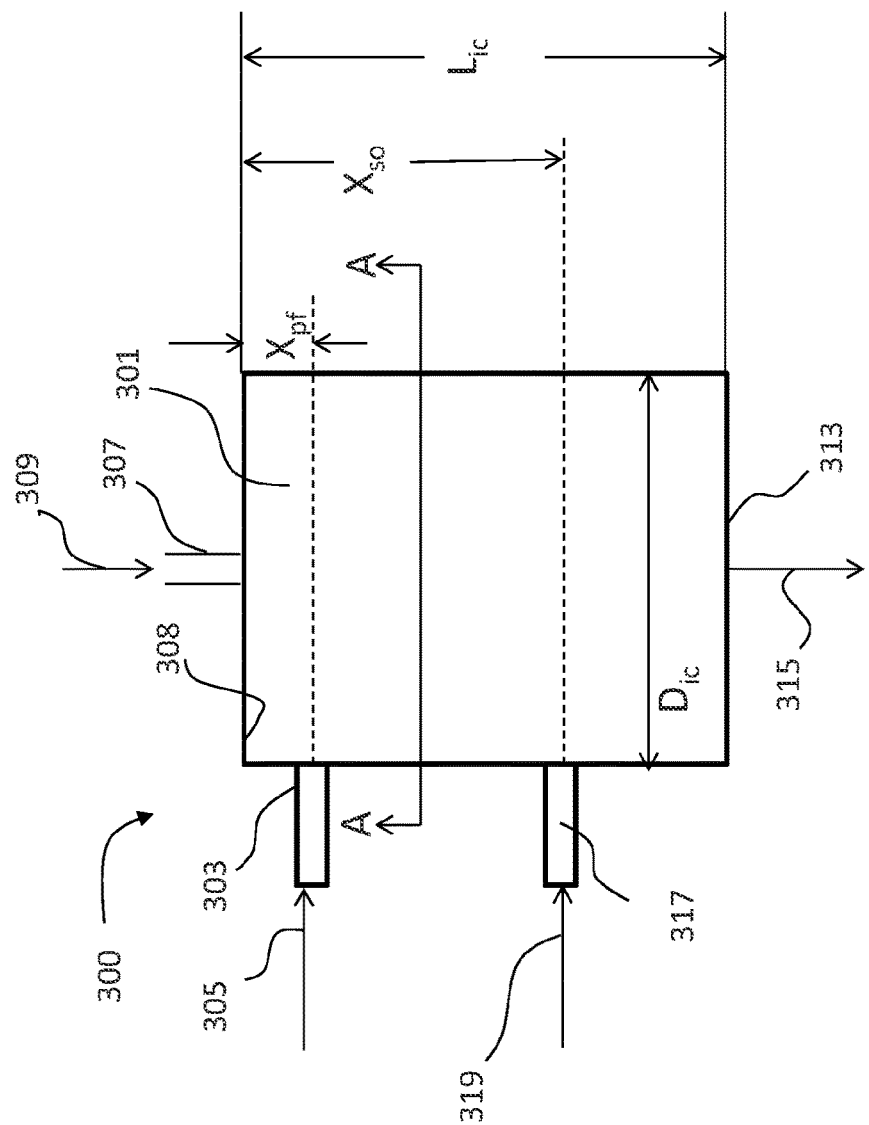
FIG. 3 is a drawing of a precombustor system according to one aspect of the invention.

FIG. 3 illustrates a cross-sectional view of the features of one embodiment of the present invention. The precombustor system 300 includes an ignition chamber 301 having tangential primary fuel injector 303 configured to tangentially introduce a primary fuel plus transport gas mixture or primary fuel stream 305 into the ignition chamber 301, a central ignition oxygen injector 307 arranged on a front wall 308 configured to deliver an ignition oxygen stream 309 substantially parallel to the central axis 311 of the ignition chamber 301, and an outlet 313 from which product gas 315 is expelled. A secondary oxygen injector 317 is shown, configured to tangentially introduce a secondary oxygen stream 319, into the ignition chamber 301 beneath the primary fuel stream 305. Secondary oxygen stream 319 may be oxygen, air, recirculated products of combustion, or some combination thereof. This secondary stream 319 reinforces the tangential flow pattern or swirl profile 401 within the chamber 301 (see for example, FIGS. 4 and 5), while also staging combustion and controlling the temperature of the walls of the ignition chamber 301 downstream of the secondary injector, and of the product gas 315 according to process operating requirements. The secondary stream 319 also forms a blanket gas to help protect the walls of the ignition chamber 301, as discussed further below. For example, the prevention of slag formation may be accomplished by operating with the walls of the ignition chamber 301 maintained at a temperature beneath the melting point of the ash component of the primary fuel stream 305.

The configuration of the precombustor system 300 is arranged with dimensions shown in FIG. 3. The primary fuel stream 305 is injected via primary fuel injector 303 at a location within the ignition chamber 301 that is a linear distance, $X_{pf}$, from the front wall 308. Secondary stream 319 is injected via secondary injector 317 at a location within the ignition chamber 301 that is a linear distance, $X_{so}$, from the front wall 308. The length of the ignition chamber, $L_{ic}$, is a linear distance from the front wall 308 to either the outlet 313 or the beginning of the transitional section 801 (see for example, FIG. 8). Another important dimension shown in FIG. 3 includes the ignition chamber diameter, $D_{ic}$, which is the effective diameter of the ignition chamber 301. $D_{ic}$ can be a linear dimension, if the diameter is constant, or may be calculated as a hydraulic diameter or average diameter between the front wall 308 and $X_{pf}$, if the diameter of the ignition chamber 301 is not constant. In accordance with the present invention, the non-dimensional ratio $X_{pf}/D_{ic}$, which is the ratio of the axial distance from the front wall 308 of the ignition chamber to the primary fuel injection, $X_{pf}$, to the ignition chamber diameter $D_{ic}$ is in the range from 0.25 to 4.0 or from 0.5 to 3.0 or from 1.5 to 3.0 or about 2.7.

Figure 4:
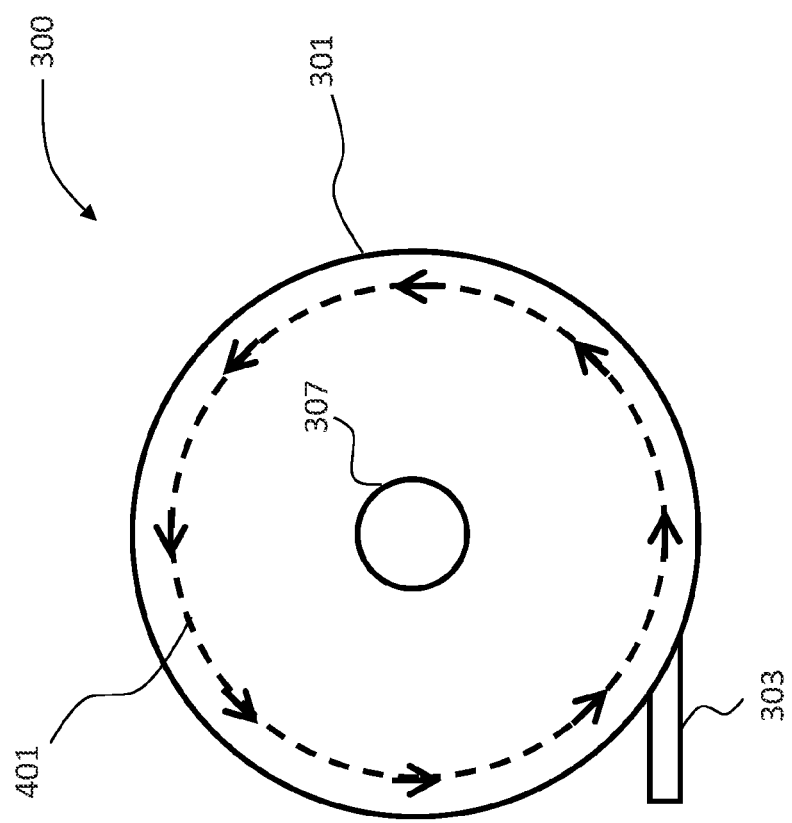
FIG. 4 is a drawing of cross-section A-A of the precombustor system depicted in FIG. 3.
Figure 5:
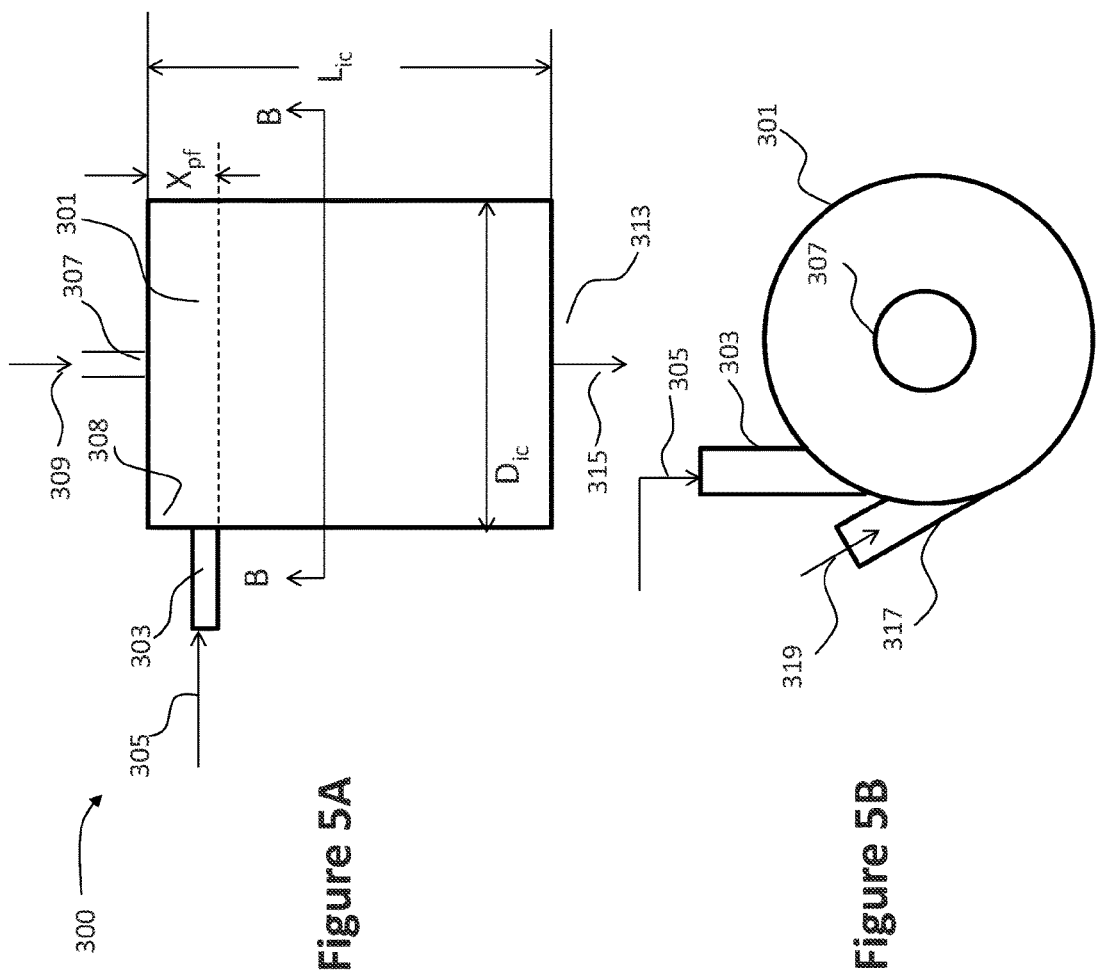
FIG. 5A is a drawing of a precombustor system according to another aspect of the invention.
FIG. 5B is a drawing of cross-section B-B of the precombustor system depicted in FIG. 5A.

Tangential injection, injection at a tangential trajectory, tangential orientation and other grammatical variations thereof, refer to a direction that has a vector component which is normal (i.e. at right angle to) the center axis and offset sufficiently from the center axis to create a swirl profile 401 around the center axis. In the case of the primary fuel stream 305 and the secondary stream 319, for example, the tangential injection into the ignition chamber 301 is provided with transport gas plus primary fuel at a direction tangential to the side walls, i.e. offset from the center axis to a point substantially at along a surface of the ignition chamber 301. The direction is provided such that a swirl profile 401 results. The flow pattern produced by tangential injection of this type is illustrated in FIG. 4, which is a cut view of Section A-A denoted in FIG. 3.

Whereas in the embodiment shown in FIG. 3, the secondary stream 319 is injected at an axial location downstream from the point of injection of the primary fuel stream 305, in another embodiment, shown in FIGS. 5A and 5B, a secondary injector 317 is provided to tangentially inject a secondary stream 319 into the ignition chamber 301 at nominally the same axial location as the primary fuel stream 305. As with the secondary injector 317 arrangement shown in FIG. 3, the gas provided via secondary stream 319 can be oxygen, oxygen-enriched air, air, nitrogen, recirculated products of combustion, or some combination thereof. The secondary stream 319 (see FIG. 5B) provided via secondary injector 317 in this embodiment has multiple functions. One function of the gas is to blanket or shield the wall of the ignition chamber 301 from erosion. The secondary stream 319 reduces erosion by being introduced tangentially and in nominally the same cross-sectional plane as the primary fuel, but slightly forward in the circumferential direction (i.e., in the direction of rotation) relative to from the primary fuel injection point as illustrated in FIG. 5B. In so doing, the secondary stream 319 deflects the path of the primary fuel stream prior to impact against the ignition chamber wall so as to minimize the erosive potential of the particles of primary fuel stream 305. Another function of the secondary oxygen stream 319, as discussed with regard to FIG. 3, is to strengthen the centrifugal flow field. Still another function of the secondary stream 319 is to facilitate early and intimate mixing between oxygen and primary fuel upon entry into the ignition chamber 301, in order to further promote particle ignition. While the embodiments shown in FIG. 3 and FIGS. 5A and 5B include single configurations for secondary stream 319 injection, each can have multiple injection points or may be present alone or in combination with one another.

Figure 6:
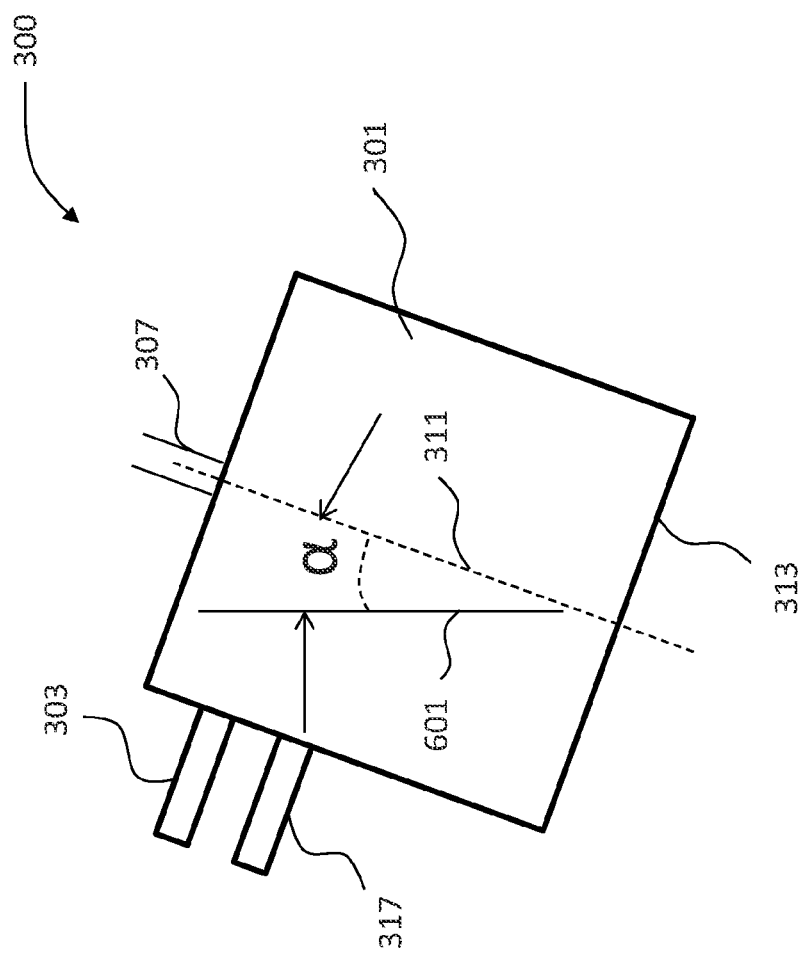
FIG. 6 is a drawing of cross-section B-B depicting an alternate arrangement of the precombustor system depicted in FIG. 3.

The entire ignition chamber 301 can be oriented with its central axis 311 offset by an angle α with respect to a vertical line 601, see FIG. 6, for example, in order to facilitate space requirements associated with the application of the precombustor system 300. However, so as to facilitate desirable solid fuel flow throughout the ignition chamber 301, the magnitude of the angle α is less than or equal to approximately 45 degrees, or less than or equal to 30 degrees.

Figure 7:
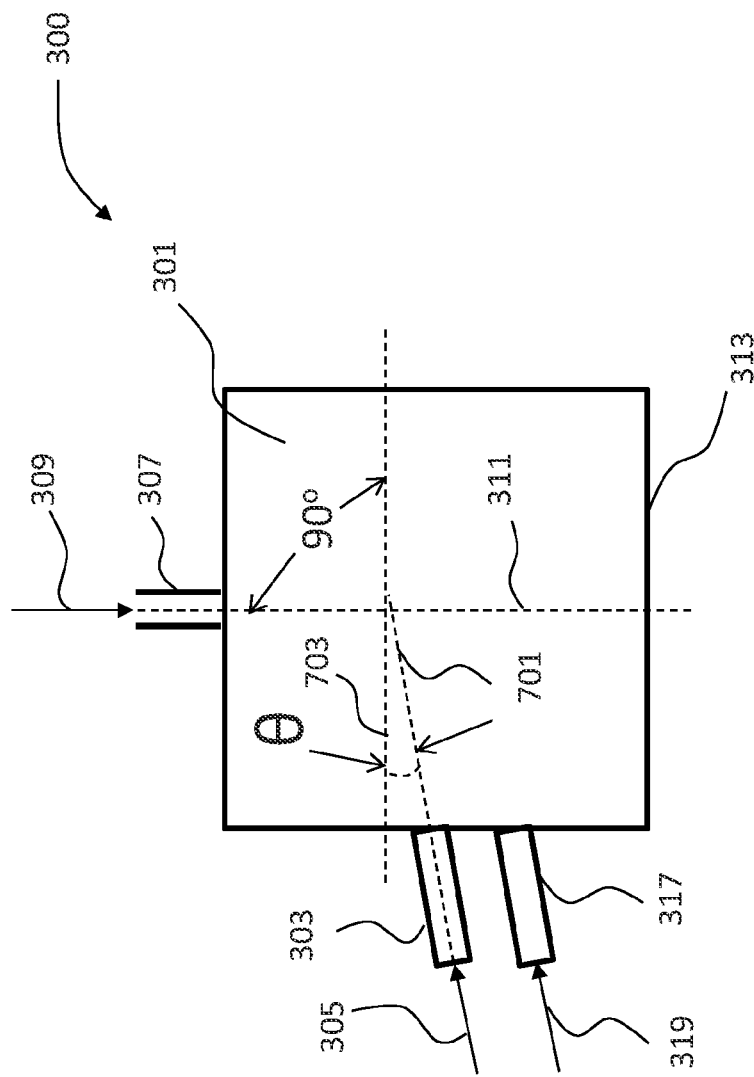
FIG. 7 is a drawing depicting an alternate arrangement of the precombustor system depicted in FIG. 3.

Altering fuel residence time within the ignition chamber 301 can be accomplished, in part, by imparting a component of the tangential flow that is parallel to the central axis. Hence, the trajectory 701 of the primary fuel stream 305 may be offset from a plane 703 that is perpendicular to the central axis by an angle Θ, as illustrated in FIG. 7. Likewise, the secondary oxygen stream 319 may be offset from a plane 703 that is perpendicular to the central axis by the same angle Θ as the primary fuel stream 305. It is advantageous for the magnitude of the angle Θ to be less than or equal to about 20 degrees or less than about 10 degrees in order to maintain sufficient particle residence time within the chamber and to preserve the beneficial fluid mechanic properties of the system.

Figure 8:
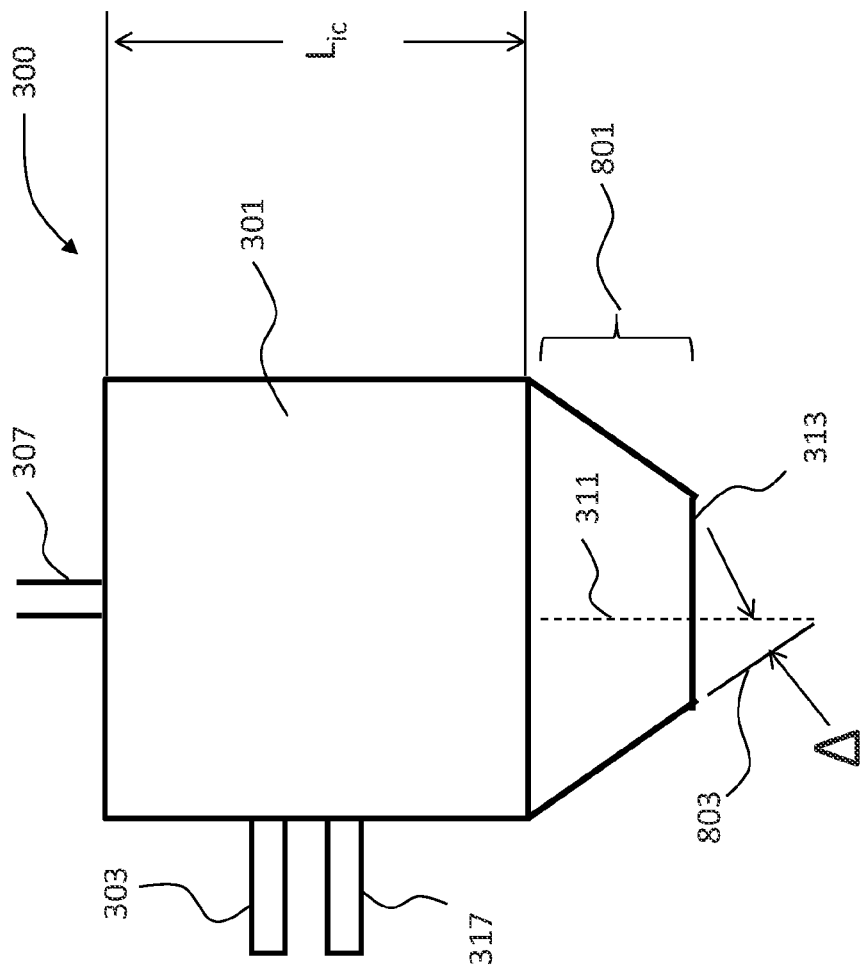
FIG. 8 is a drawing of an alternate arrangement of a precombustor system according to an aspect of the invention showing an exemplary transitional section geometry.

As shown in FIG. 8, one embodiment of the precombustor system 300, according to the present disclosure, includes a transitional section 801. The transitional section 801 receives the product gas from the ignition chamber 301 and subsequently delivers said product gas to the outlet 313, which may include a fuel nozzle or to a boiler or furnace. The transitional section 801 can be of arbitrary cross-sectional geometry, and comprises surfaces that are offset from the central axis 311 by an angle Δ which may vary along the surface, but whose magnitude or average magnitude, as indicated with reference to line 803, is less than or equal to about 45 degrees from the central axis 311.

Figure 9:
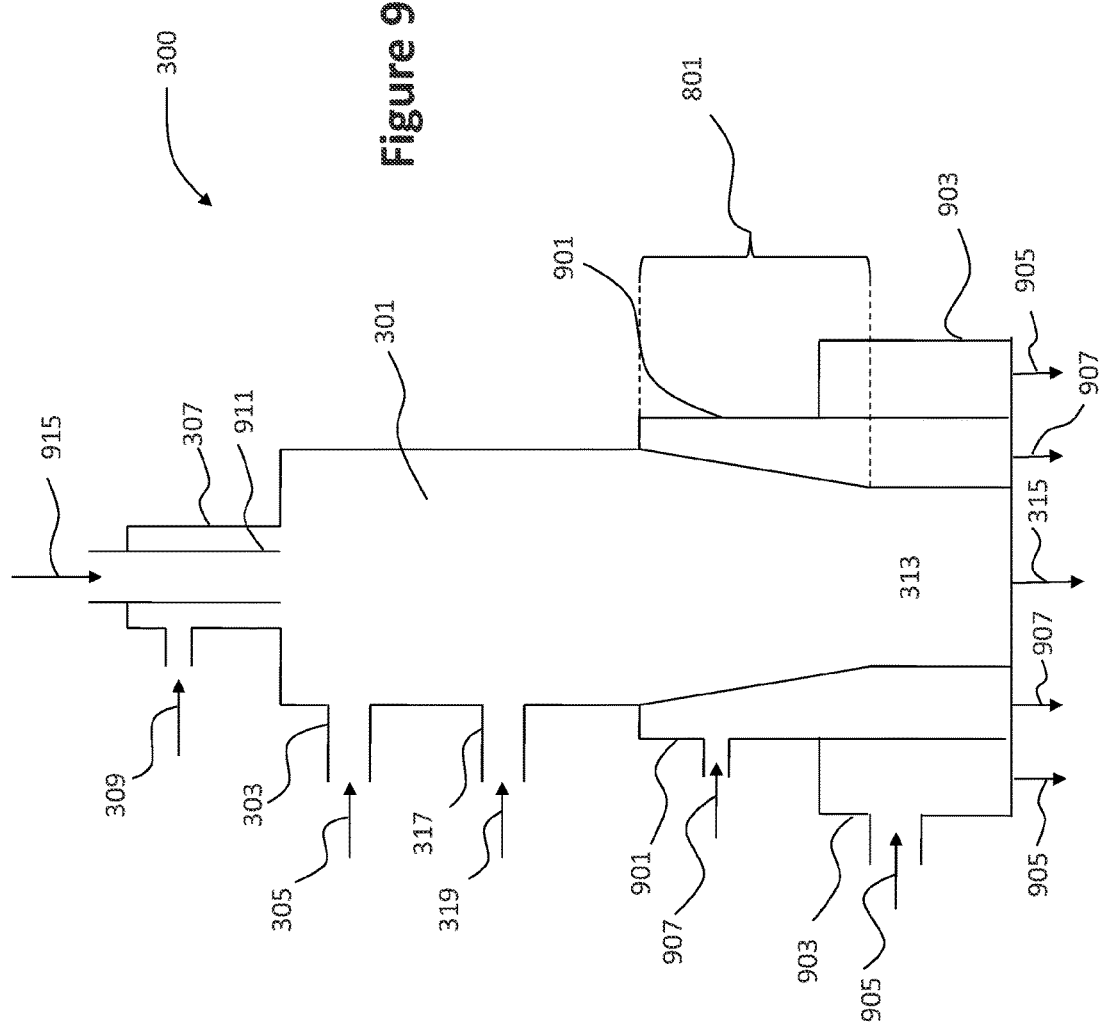
FIG. 9 is a drawing of another precombustor system according to an aspect of the invention showing an exemplary transitional section and injection nozzle with outer oxygen and combustion air.

Yet another embodiment of the precombustor system 300, according to the present disclosure, includes an optional outer oxygen injector 901 and a combustion air injector 903 as illustrated in FIG. 9. This embodiment is particularly relevant for applications in which the inventive system is installed in an existing air-fuel combustion system. The precombustor system 300 of FIG. 9 includes a central ignition oxygen injector 307 configured to deliver an ignition oxygen stream 309 to the ignition chamber 301. In addition, a pilot fuel injector 911 is configured to provide pilot fuel 915 to the ignition chamber. In such an application, the combustion air 905 is available from the existing supply and the inventive system is installed in place of a prior air-fuel burner. The optional outer oxygen stream 907, which is most advantageously placed between the combustion air 905 and the product gas 315 of the precombustor system 300, can be used as a means to further improve the combustion efficiency of the inventive system. Another feature of the embodiment shown in FIG. 9 is the inclusion of an injection nozzle as the outlet 313 downstream of the transitional section 801. Depending upon the specific process use of the product gas 315, the injection nozzle or outlet 313 is sometimes present to tailor the flow of product gas 315 to a velocity and orientation that is optimal for its end use.

Figure 10:
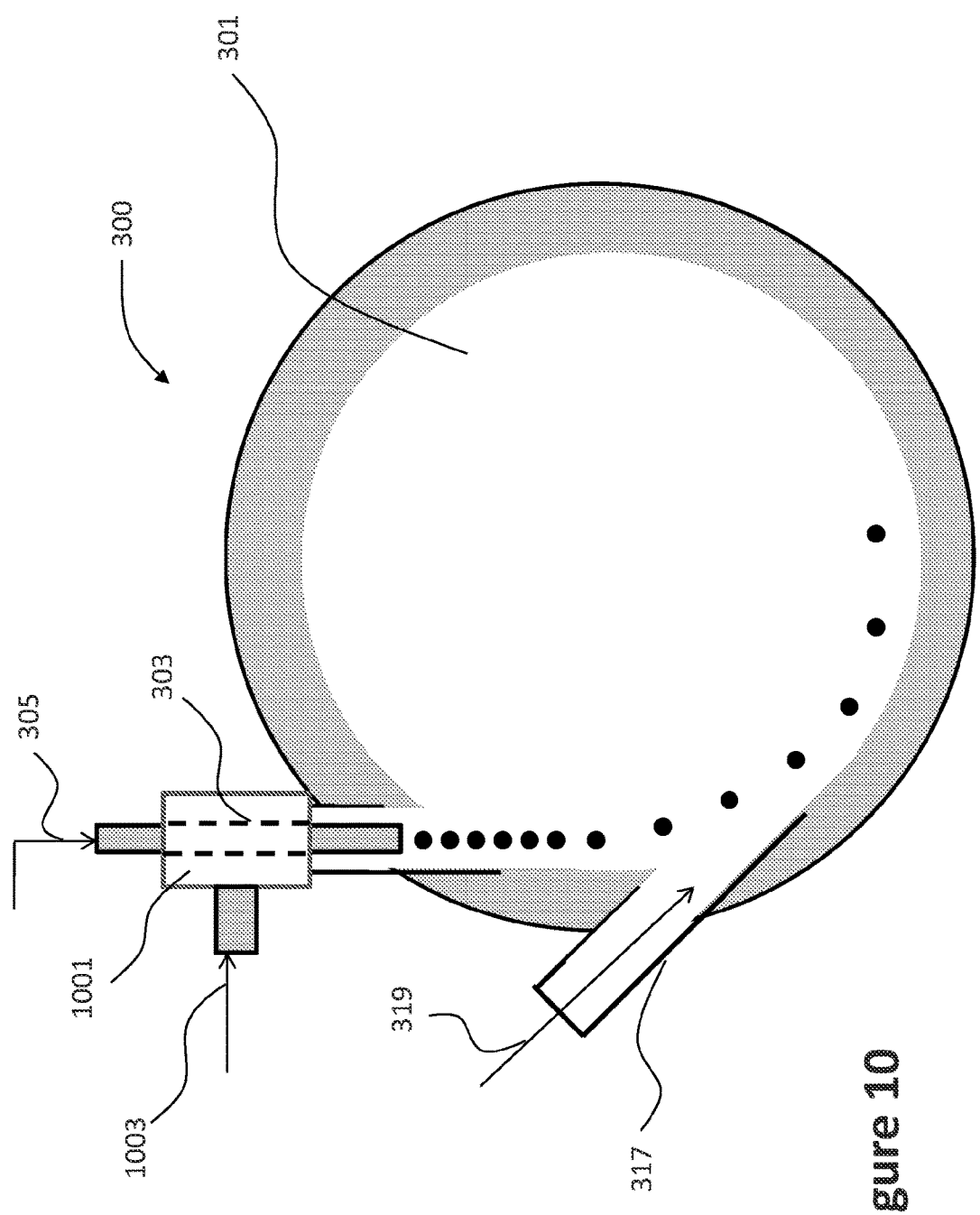
FIG. 10 is a drawing of cross-section B-B depicting an alternate arrangement of the precombustor system depicted in FIG. 3 comprising an exemplary blanketing oxidizer.

In still another embodiment, a primary oxygen stream 1003 is injected in a primary oxygen injector 1001 around the primary fuel stream 305 as illustrated in FIG. 10, which is a view taken from the same plane as FIG. 5B. In addition, the precombustor system 300 of FIG. 10 includes secondary injector 317 and secondary stream 319 having the same configuration as shown and described in FIGS. 5A and 5B. The advantage of this embodiment is that rapid and intimate mixing between the oxygen and fuel takes place immediately upon injection into the chamber and thereby assists in rapid ignition of the primary fuel stream 305.

Figure 11:
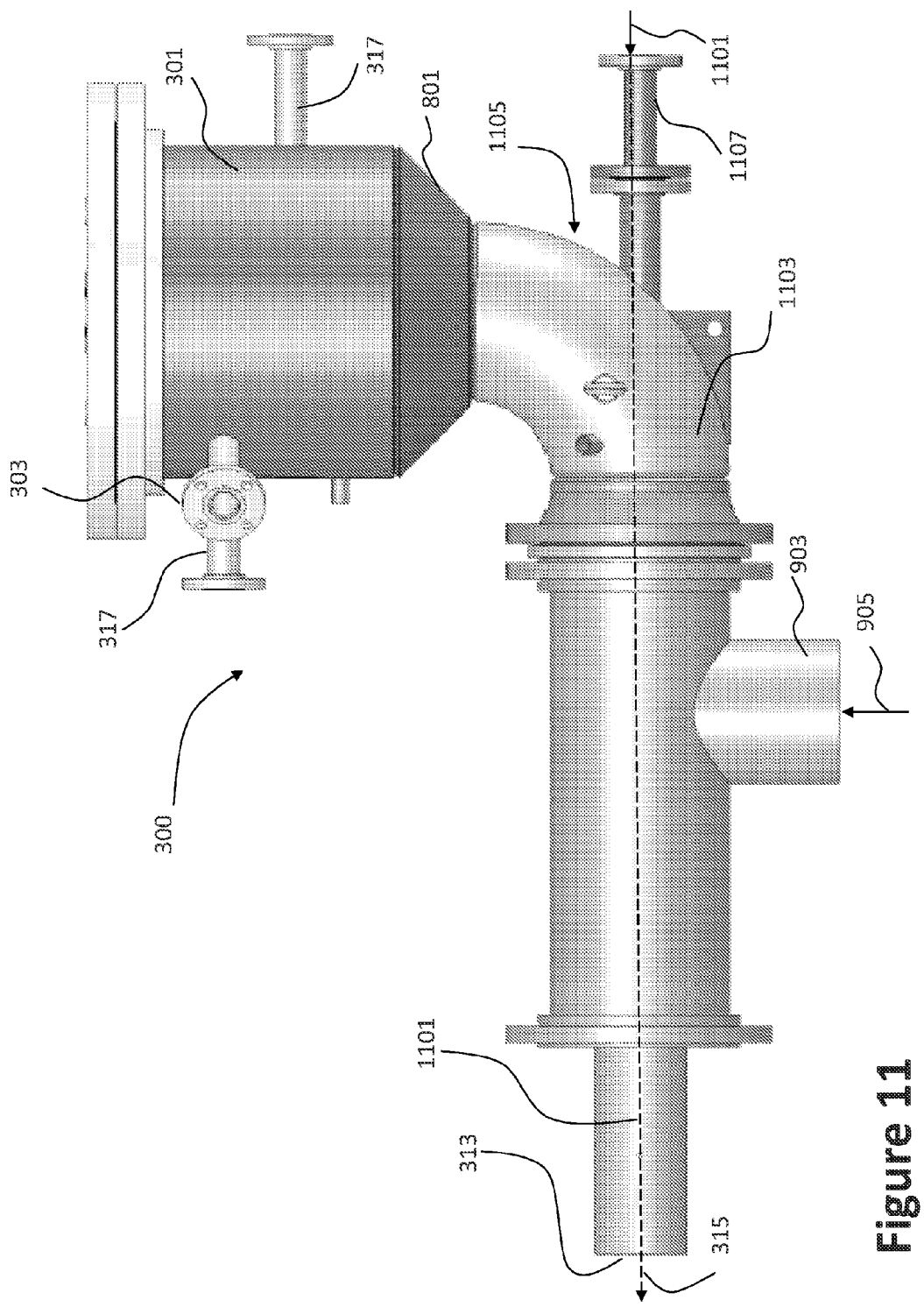
FIG. 11 is a plan view of a precombustor system according to an aspect of the invention wherein the flow path described by the injector section is curved from largely vertical at the inlet to largely horizontal at the outlet, and also comprises an axial sparger.
Figure 12:
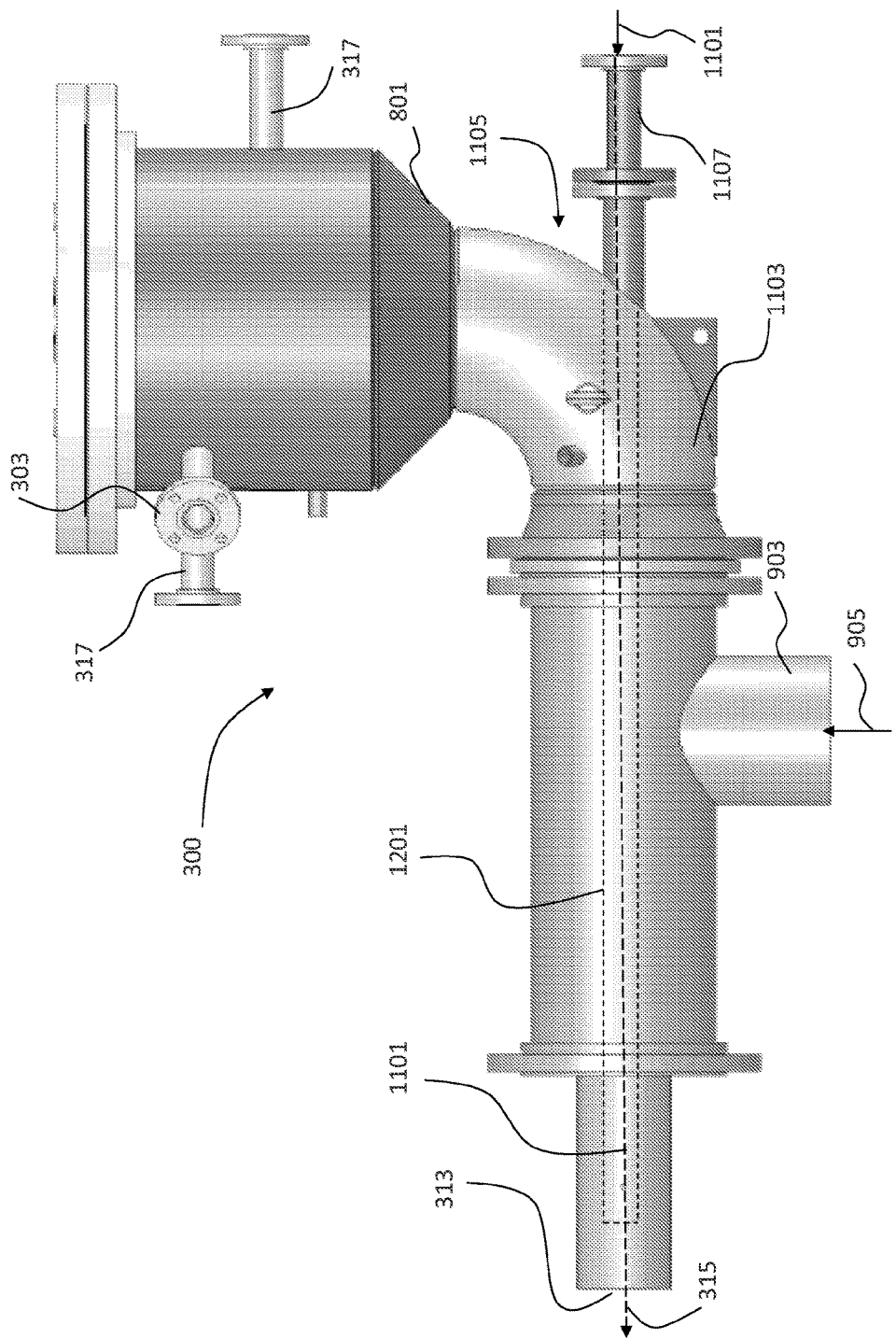
FIG. 12 is a plan view of another precombustor system according to the embodiment of FIG. 11 which also comprises a central oxidant conduit.

FIG. 11 illustrates an embodiment of the precombustor system 300 wherein the product gas 315 is injected into a process furnace or boiler (not shown) with a trajectory that is nominally parallel with a horizontal line 1101. The system of FIG. 11 includes a primary fuel injector 303 and two secondary injectors 317 as shown and described in FIGS. 5A and 5B. One or both of the secondary injectors 317 may be present and/or utilized. It should be understood that the actual trajectory of primary fuel and secondary oxidizer can deviate from a horizontal line by as much as 45 degrees while yet falling within the scope of the present invention. This embodiment comprises the ignition chamber 301, the transition section 801, and an injector nozzle 1103 that forms a conduit between the transition section 801 and the process furnace or boiler. The injector nozzle 1103 of this embodiment includes a turning radius 1105 as also shown in FIG. 11. FIG. 11 also shows an optional axial sparger 1107 that can assist in aerating the particulate in the nozzle flow stream to prevent saltation. The sparging fluid 1109 can be air, oxygen enriched air, oxygen, or any other suitable fluid. A related variant of this embodiment is shown in FIG. 12, which has a similar arrangement to the arrangement shown and described with respect to FIG. 11, wherein the sparger 1107 is connected to a central oxidizer nozzle 1201 delivering oxidizer (air or oxygen) in a conduit along the center axis of the nozzle to assist in combustion at the outlet 313.

Figure 13:
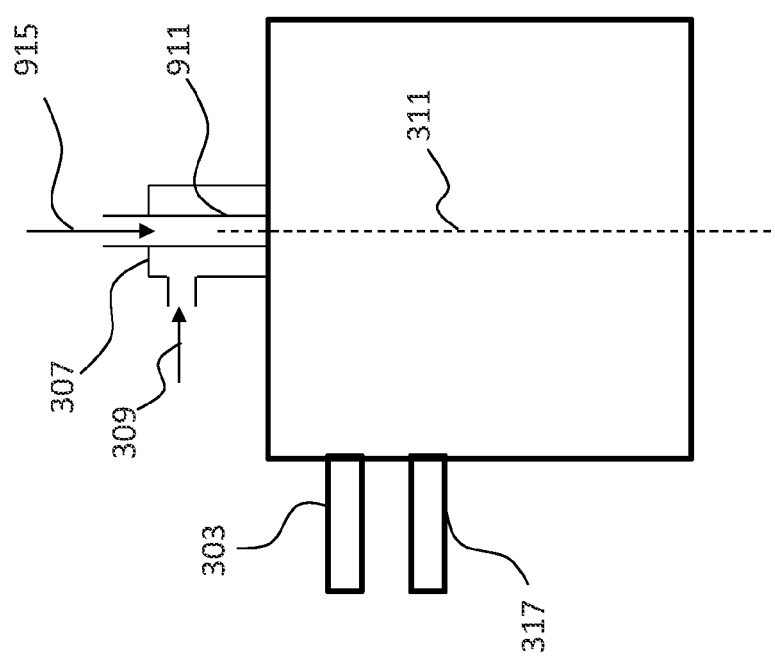
FIG. 13 is a drawing of a precombustor system according to another aspect of the invention wherein ignition oxygen is injected in an annulus surrounding pilot fuel.
Figure 14:
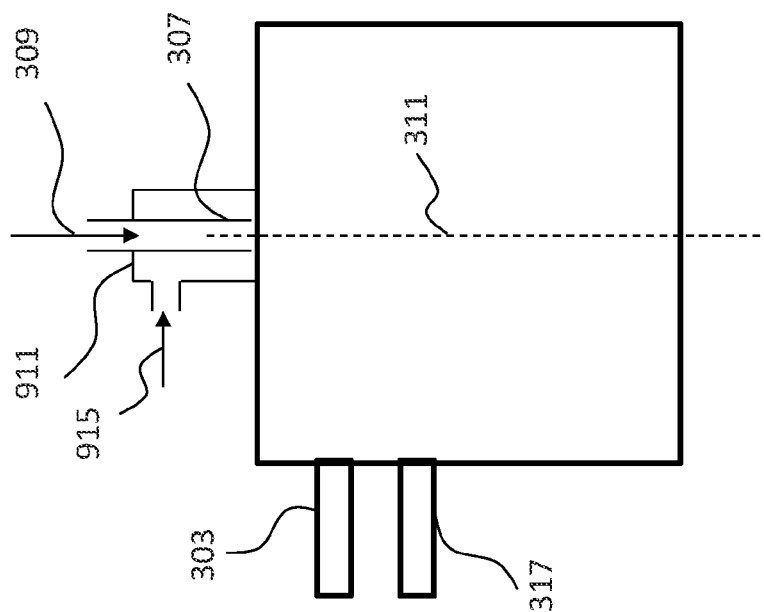
FIG. 14 is a drawing of a precombustor system according to another aspect of the invention wherein pilot fuel is injected in an annulus surrounding ignition oxygen.

Ignition and heat up of the inventive system may be initially achieved via introduction of pilot fuel 915, for example, through pilot fuel injector 911 at the front wall 308 of the ignition chamber 301. It is advantageous in such circumstances for the pilot fuel 915 and ignition oxygen stream 309 to be injected in proximity to one another. The embodiments illustrated in FIGS. 13 and 14 illustrate two exemplary orientations of the pilot fuel 915 and ignition oxygen stream 309. FIG. 13 illustrates injection of the pilot fuel 915 via a pilot fuel injector 911 along the central axis 311 of the ignition chamber 301 surrounded by ignition oxygen stream 309 injected via an ignition oxygen injector 307. FIG. 14 illustrates the reverse configuration; i.e., one in which the ignition oxygen stream 309 is directed along the central axis 311 and is surrounded by a pilot fuel injector 911 containing the pilot fuel 915. The pilot fuel 915 can be any solid, liquid or gaseous fuel, such as natural gas, fuel oil, pulverized coal or fine particle residue from biomass grinding, or any other readily ignitable fuel. Alternatively, the pilot fuel 915 may be a small amount of pulverized coal, which can be convenient, especially if pulverized coal continues to be fired along-side the wood or other substitute fuel. Finally, the pilot fuel 915 may be the biomass fines, which would have to be separated from the balance of biomass fuel after the milling process. Other pilot fuels 915 are possible, depending upon availability. The pilot fuel 915 is provided to initiate and control heating in the ignition chamber 301 of the precombustor system 300 prior to injection of the primary fuel stream 305.

Having described the physical features of the several embodiments of the inventive system, we now explain via two examples the principles by which the inventive system attains its surprisingly good performance and the limitations imposed on certain features of the invention that enable the system to function most effectively. We refer to FIG. 3 for the embodiment of the inventive system to which the examples apply. Except where specifically modified in the below description, the arrangement of the precombustor system 300 is as shown and described for FIG. 3. The secondary stream in these examples is provided via secondary injector 317 positioned downstream from the front wall 308 of the ignition chamber 301 and the angles α and Θ are both zero. The primary fuel utilized in the Examples is ground wood chips having 20 wt % moisture, a Higher Heating Value of nominally 6060 Btu/lb. and a particle size distribution as presented in Table 1. Results presented in these Examples were calculated based on a steady-state computation fluid dynamics (CFD) model developed using the commercially available Fluentsoftware package.

TABLE 1

| Particle Group No. | Mean Particle Size (Mm) | % Smaller Than |
|---|---|---|
| 1 | 0.148 | 3 |
| 2 | 0.286 | 16 |
| 3 | 0.493 | 29 |
| 4 | 0.794 | 50 |
| 5 | 0.968 | 60 |
| 6 | 1.27 | 78 |
| 7 | 1.91 | 97 |
| 8 | 3.75 | 100 |

Example 1

Example 1 compares performance of the inventive system having two configurations highlighted by different values of one geometric parameter: the non-dimensional ratio $X_{pf}/D_{ic}$, which is the ratio of the axial distance from the front wall 308 of pf is the ignition chamber to the primary fuel injection to the ignition chamber diameter. Note that the ratio $X_{pf}/D_{ic}$, which is ratio of the axial distance from the front wall 308 of the ignition chamber 301 to the secondary strewn injection point, also differs for the two configurations. However, the distance between these two geometric properties is kept the same only for the sake of convenience. The ratio of importance, as will be illustrated and explained henceforth, is that of the primary fuel injection to the ignition chamber diameter $X_{pf}/D_{ic}$. The analysis shows that one of these exemplary configurations produces unacceptable performance and therefore is outside the range of allowable geometric parameter of the inventive system, while the other configuration, unexpectedly, yields outstanding performance and therefore lies within the range of acceptable geometry.

TABLE 2

| PARAMETER | CONFIGURATION "A" | CONFIGURATION "B" |
|---|---|---|
| $L_{ic}/D_{ic}$ | 1.0 | 1.0 |
| $X_{pf}/D_{ic}$ | 0.20 | 0.60 |
| $X_{ss}/D_{ic}$ | 0.40 | 0.80 |
| Ignition Oxygen Flow Rate (kg/hr) | 43 | 43 |
| Ignition Oxygen Injection Velocity (m/sec) | 72 | 72 |
| Primary Fuel Flow Rate (kg/hr) | 454 | 454 |
| Transport Gas (Air) Flow Rate (kg/hr) | 43 | 43 |
| Primary Fuel Injection Velocity (m/sec) | 20 | 20 |
| Secondary Stream (Oxygen) Flow Rate (kg/hr) | 64.8 | 64.8 |
| Secondary Stream Injection Velocity (m/sec) | 27 | 27 |

Tangential injection of the primary fuel stream 305 induces a centrifugal force on the primary fuel particles that pushes them radially outward, and acts to keep them in suspension as they traverse the circumference of the ignition chamber 301. This is a primary mechanism which maintains the particles in temporary suspension against the force of gravity. The strength of this mechanism, all other factors being equal, increases with the square of the tangential injection velocity. While not intended to limit the scope of the invention, it has been found that a primary fuel injection tangential velocity in range between 20 and 60 m/sec generally yields an acceptable balance between centrifugal force on the one hand (desirable), and erosive potential and pressure loss on the other hand (undesirable), all of which increase with increasing velocity. The strength of the centrifugal force on each primary fuel particle is also proportionate to the mass of the primary fuel particle. Hence, for a primary fuel stream 305 having a given inlet tangential velocity and a fixed particle density, larger, heavier particles experience centrifugal force of a greater magnitude than smaller, lighter ones. This property is made use of in the inventive system as the smaller, lighter primary fuel particles, which are less strongly influenced by the centrifugal force field, are thereby able, under certain prescribed conditions, to break away from the centrifugal field and migrate toward the central axis 311 of the ignition chamber 301 to react with ignition oxygen stream 309 and thus become a source of energy for sustained ignition within the ignition chamber 301.

Figure 15:
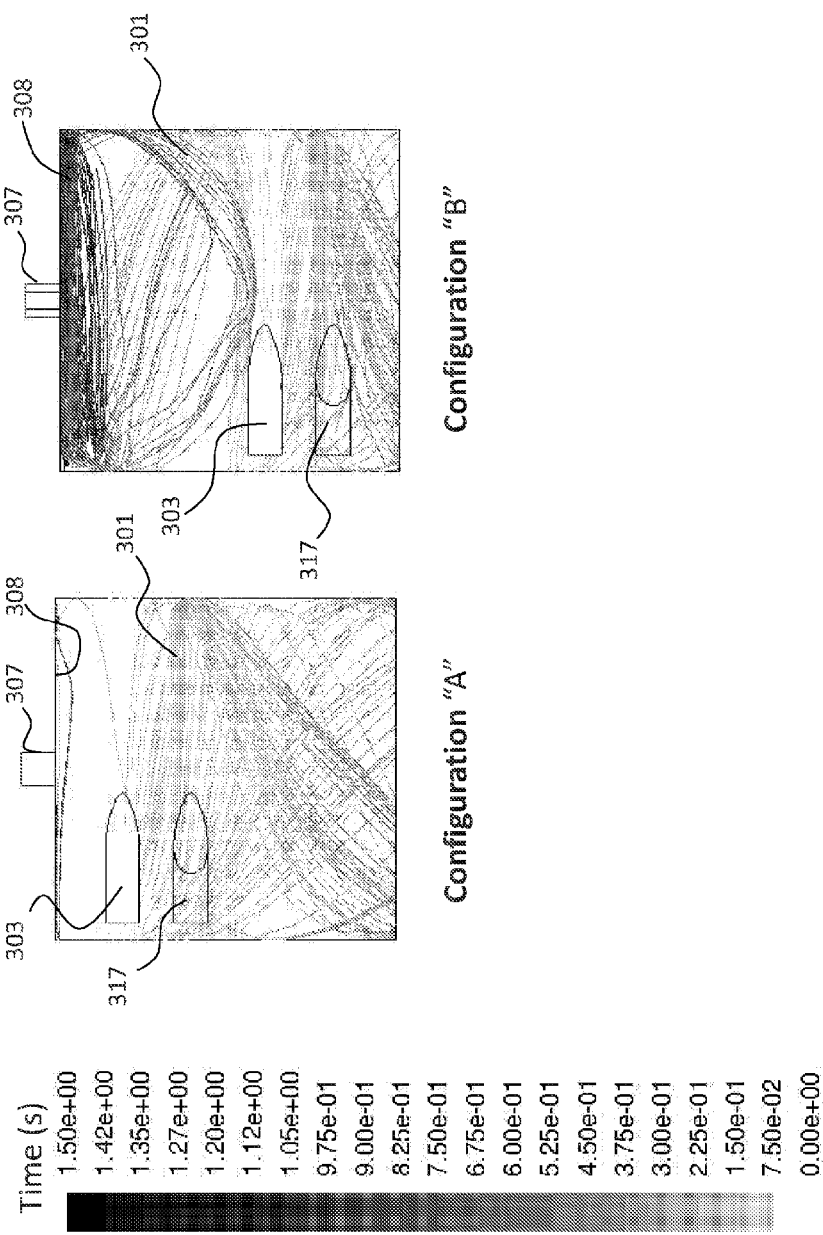
FIG. 15 is a drawing of CFD results comparing particle tracking of Configurations "A" and "B" of Example 1.

The calculated particle motion of particles smaller than 0.286 mm (286 microns, groups 1 and 2 in Table 1) pertaining to Configuration "A" is depicted in FIG. 15. Note that the particle density is greatest in the vicinity of the primary fuel injection point and the particles gradually (i.e., as time increases according to the time-scale provided) move downward under the action of gravity. Total residence time reaches a maximum of approximately 0.4 seconds. However, for Configuration "B", while the particle density is still a maximum around the primary fuel injection port, a significant amount of particles surprisingly rise upward against the force of gravity, and this increases the peak residence time to nearly 1 second. This surprising result can only be better understood by an integrative analysis that takes into account the details of the velocity and pressure distributions in the ignition chamber, as well as the coupling between the fluid mechanics and combustion phenomena.

Figure 16:
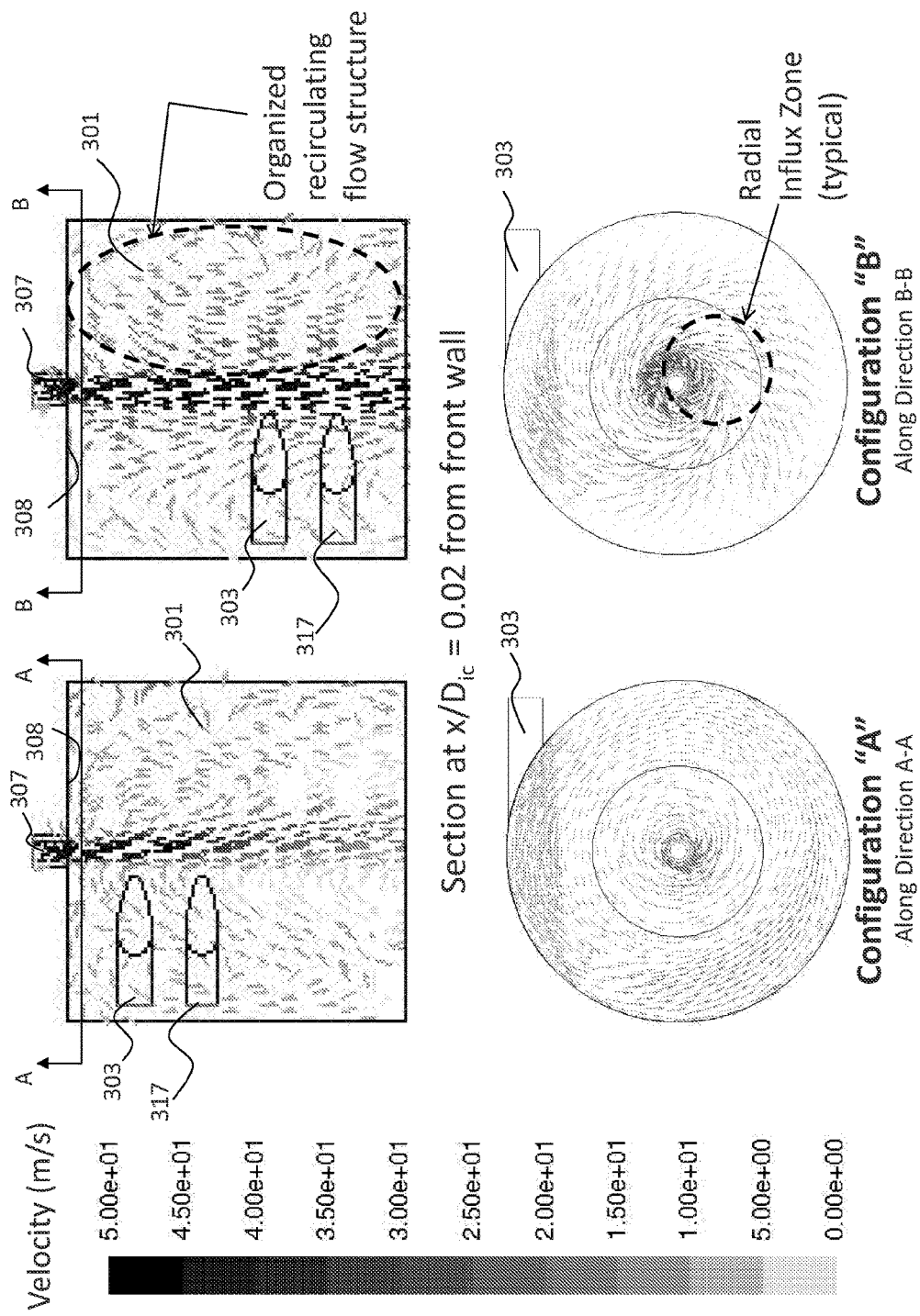
FIG. 16 is a drawing of CFD results comparing velocity fields of Configurations "A" and "B" of Example 1.

Gas velocity vectors within the ignition chamber 301 for the two configurations are presented in FIG. 16. Two sectional views are shown for each Configuration "A" and "B", respectively. The top one represents a vertical plane that crosses through the central axis 311 (see for Example, FIG. 3), while the lower one represents a horizontal plane taken at an axial distance $x/D_{ic}$ equal to 0.02 from the front wall. Comparing top views, it is noted that for Configuration "B", the central oxygen ignition stream issuing from the central oxygen ignition injector 307 develops higher velocity and penetrates deeper into ignition chamber 301 relative to Configuration "A". Moreover, an organized recirculating flow structure (ORFS) is evident is evident in Configuration "B" between the front wall 308 where ignition oxygen is injected, and the point of primary fuel injection. This ORFS is the immediate mechanism by which gases and small particles are transported upstream against gravity. Material flows upward along the wall and then radially inward toward the center axis where it is entrained by the ignition oxygen jet. Such an organized flow structure is notably absent from Configuration "A". Visualization of the entrainment mechanism facilitated by the ORFS is enhanced via the lower sectional views. Again we focus on Configuration "B" which clearly shows the combined circumferential/radially inward migration of the gas proximate the front wall. Comparison with Configuration "A" indicates that the radially inward component is missing for this case.

Figure 17:
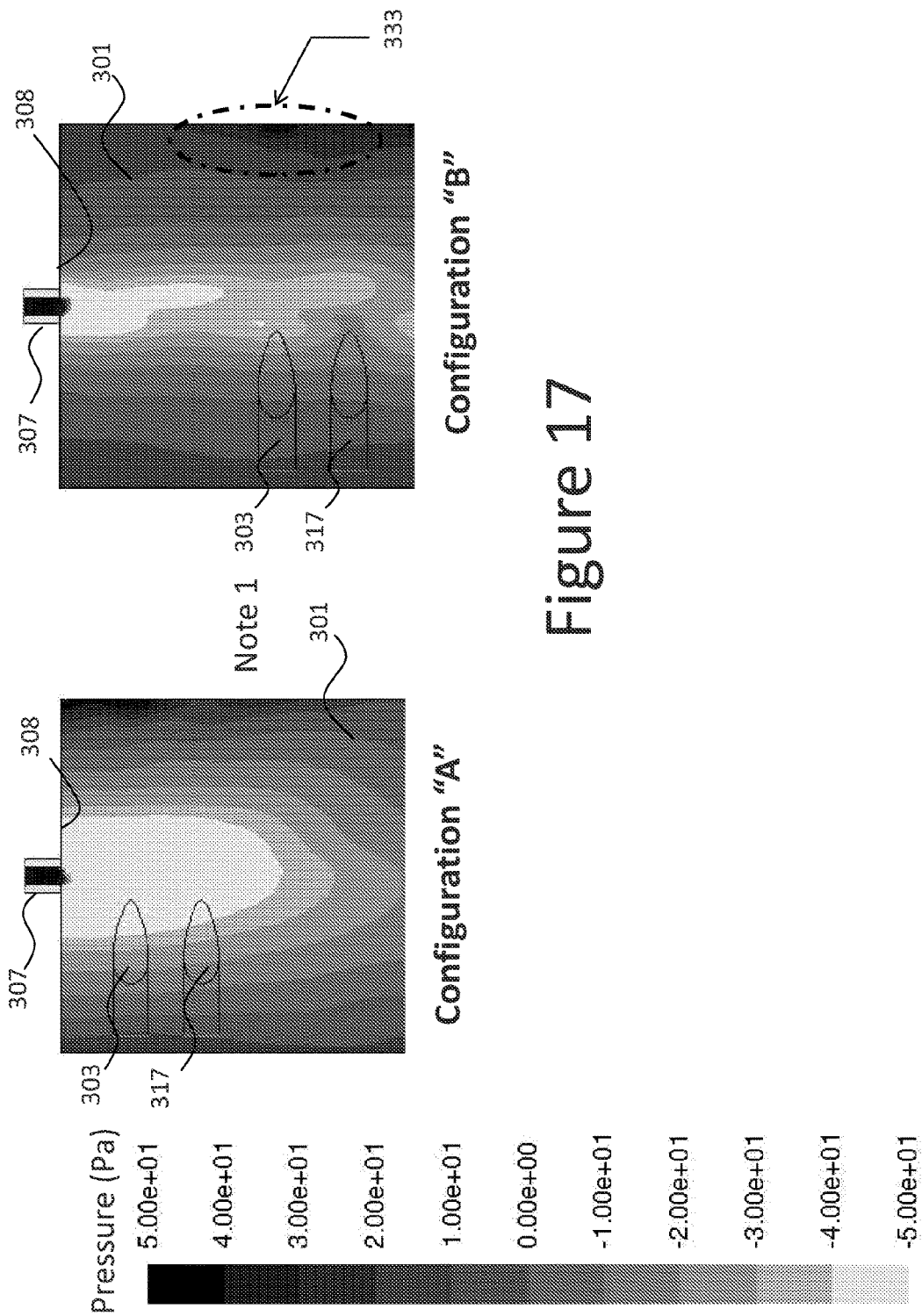
FIG. 17 is a drawing of CFD results comparing pressure fields of Configurations "A" and "B" of Example 1.

A starting point for the cause of the ORFS development in Configuration "B" can be deduced via analysis of the pressure field shown in FIG. 17. It is noted that the pressures shown in this figure are relative pressures; that is, local pressure values minus the average pressure in the entire ignition chamber 301. Due to the radial forces proceeding from the circumferential (tangential) flow, a region of high pressure develops on the periphery of the ignition chamber at the elevation of the primary fuel injection. This occurs in both configurations. A second fluid phenomenon common to both configurations is the region of low pressure in proximity to the main axis due to the suction created by the ignition oxygen stream. The salient qualitative difference between Configurations "A" and "B" is that in the latter case, the high pressure region 333 is adjacent to a low pressure region in the upstream direction. The pressure gradient thus formed generates a motive force for gas and fuel particles to move in the upstream direction against the force of gravity, ultimately enabling the gas and particles to be entrained into the central ignition oxygen stream. It is clear from this analysis that the axial positioning of the primary fuel stream injection location $X_{pf}$ substantially downstream of the front wall 308 is responsible for the generation of the ORFS in Configuration "B", whereas the proximity between the primary fuel stream location and the front wall is responsible for the absence of an organized reverse flow in Configuration "A".

Figure 18:
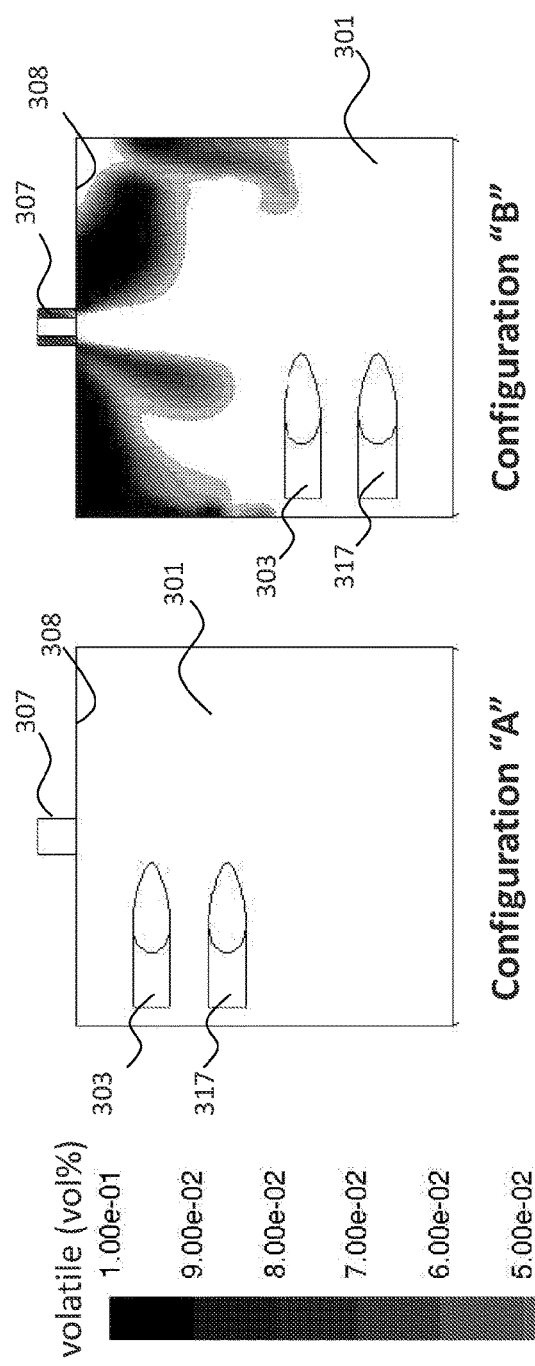
FIG. 18 is a drawing of CFD results comparing volatile gas fields of Configurations "A" and "B" of Example 1.
Figure 19:
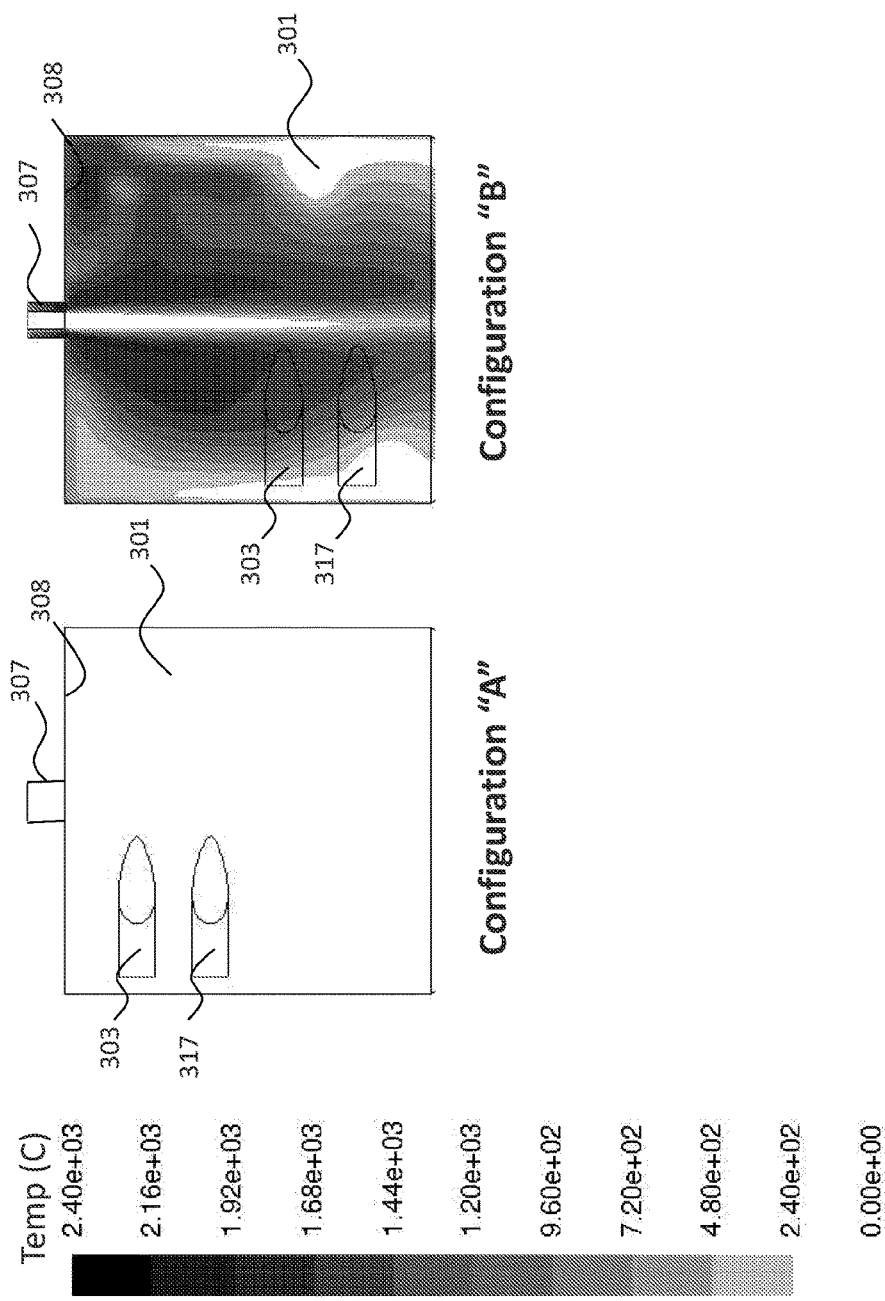
FIG. 19 is a drawing of CFD results comparing temperature fields of Configurations "A" and "B" of Example 1.

The fluid mechanic effects just described and illustrated in FIGS. 15 through 17 have a direct effect on combustion which can be summarized as follows: The entrainment of gas and small solid particles into the ignition oxygen associated with the organized recirculating flow structure of Configuration "B" enables the release of a significant amount of volatile gases such as carbon monoxide, hydrogen, and various hydrocarbons which are subsequently combusted by the ignition oxygen. The concentration of volatile species for Configurations "A" and "B" within the ignition chamber 301 are presented in FIG. 18. The resultant conversion of chemical to thermal energy generated by the combustion reactions increases the prevailing temperature within ignition chamber 301 and thereby creates a self-sustaining thermal process. The effect is quite profound as illustrated in FIG. 19. The prevailing temperature profile of Configuration "B" clearly shows the formation of a flame front that has developed along the edge of the ignition oxygen jet emanating from the ignition oxygen injector 307, whereas no such reaction was able to take place in Configuration "A" due to the aforementioned absence of volatile species in the vicinity of the ignition oxygen jet. Finally, the expansion of gases resulting from the high temperature combustion taking place along the central axis of Configuration "B" generates the higher velocity of the central oxygen ignition jet and its deeper penetration into the ignition chamber, further augmenting the fluid and fuel particle entrainment capacity of the jet, which ultimately adds to the stability of the ORFS.

It can be seen from the preceding example the importance of the axial distance between the front wall 308 of the ignition chamber where the ignition oxygen stream 309 is injected and the location where primary fuel is tangentially introduced into the system. When the distance is too small, the resultant pressure field prevents the formation of an organized recirculating flow structure between the front wall 308 and the point of primary fuel injection, which subsequently prevents the release and combustion of volatile matter that is needed to sustain ignition within the chamber. By contrast, when the proper distance is established between the front wall 308 and the point of primary fuel injection, the pressure field is favorably altered, allowing establishment of an organized recirculating flow structure between the front wall 308 and primary fuel injection location. This ORFS carries both fluid and small primary fuel particles, increasing solid fuel residence time, enabling release and combustion of volatile matters, and yielding a stable and well-developed combustion flame to be formed at the boundary of the ignition oxygen stream.

Figure 20:
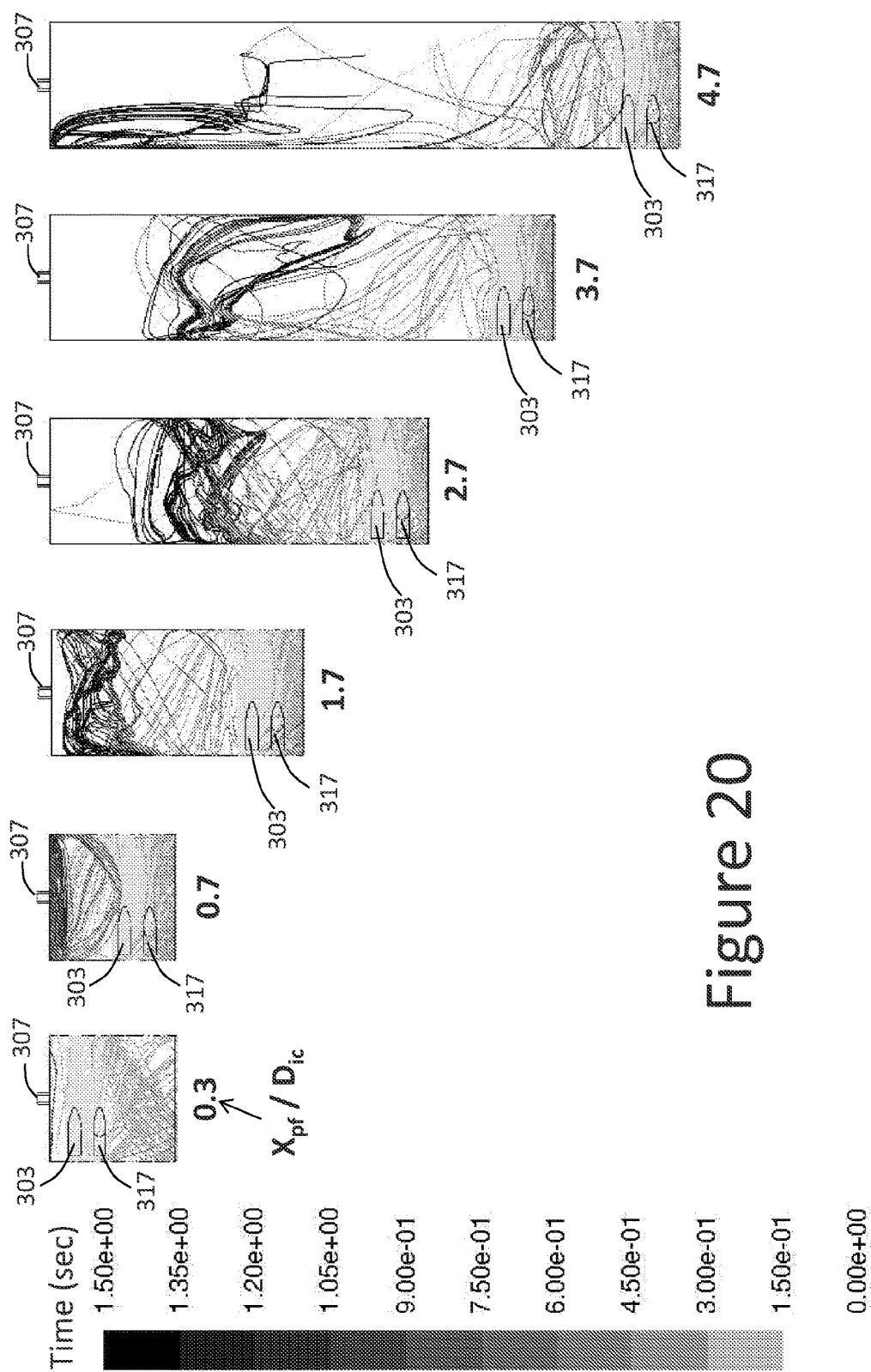
FIG. 20 is a drawing of CFD results comparing the effect of the geometric parameter $X_{pf}/D_{ic}$ on the particle movement within the inventive system depicted in FIG. 3.

According to exemplary configurations of the present invention, the minimum non-dimensional axial distance between the front wall 308 and the primary fuel injection point, $X_{pf}/D_{ic}$, is equal to approximately 0.25. Further examples are provided for values of $X_{pf}/D_{ic}$ up to approximately 4.7 to understand the range within which the favorable interaction between the ignition oxygen jet from the ignition oxygen injector 307 and the centrifugal field of the tangential primary fuel injection would persist. In order to enable this extended range, the non-dimensional ignition chamber 301 length, $L_{ic}$, is extended to 5.0, while all flow rates and velocities prescribed in Table 2 remain the same. The particle tracking/residence time results for this phase of the analysis are summarized in FIG. 20. We note the upward migration of small particles and maximum residence time increases for $X_{pf}/D_{ic}$ equal to 1.7 (for example relative to $X_{pf}/D_{ic}$ equal to 0.6) to a value of approximately 1.5 seconds. Beyond this point; i.e., for $X_{pf}/D_{ic}$ equal to 2.7 and 3.7, the absolute upward migration distance of the small primary fuel particles continues to increase, and maximal residence time remains constant at approximately 1.5 seconds. Note that for $X_{pf}/D_{ic}$ equal to 2.7, the amount of primary fuel particles reaching the maximum residence time increases relative to $X_{pf}/D_{ic}$ equal to 1.7, while it seems to diminish somewhat for $X_{pf}/D_{ic}$ equal to 3.7. This diminishment may be due to the fact that the farther the particles migrate upwardly, the more they completely combust and gasify; hence, they eventually disappear from the flow field. We see, however, that for $X_{pf}/D_{ic}$ equal to 4.7, while a small fraction of small primary fuel particles migrate the entire way to the front wall 308, the concentration which even starts the upward migration substantially reduces from the case of $X_{pf}/D_{ic}$ equal to 3.7. Hence this reduction may not be due to the gradual gasification and combustion of the particles, but rather to the weakening of the synergistic effect between the ignition oxygen jet and the tangential primary fuel injection.

Figure 21:
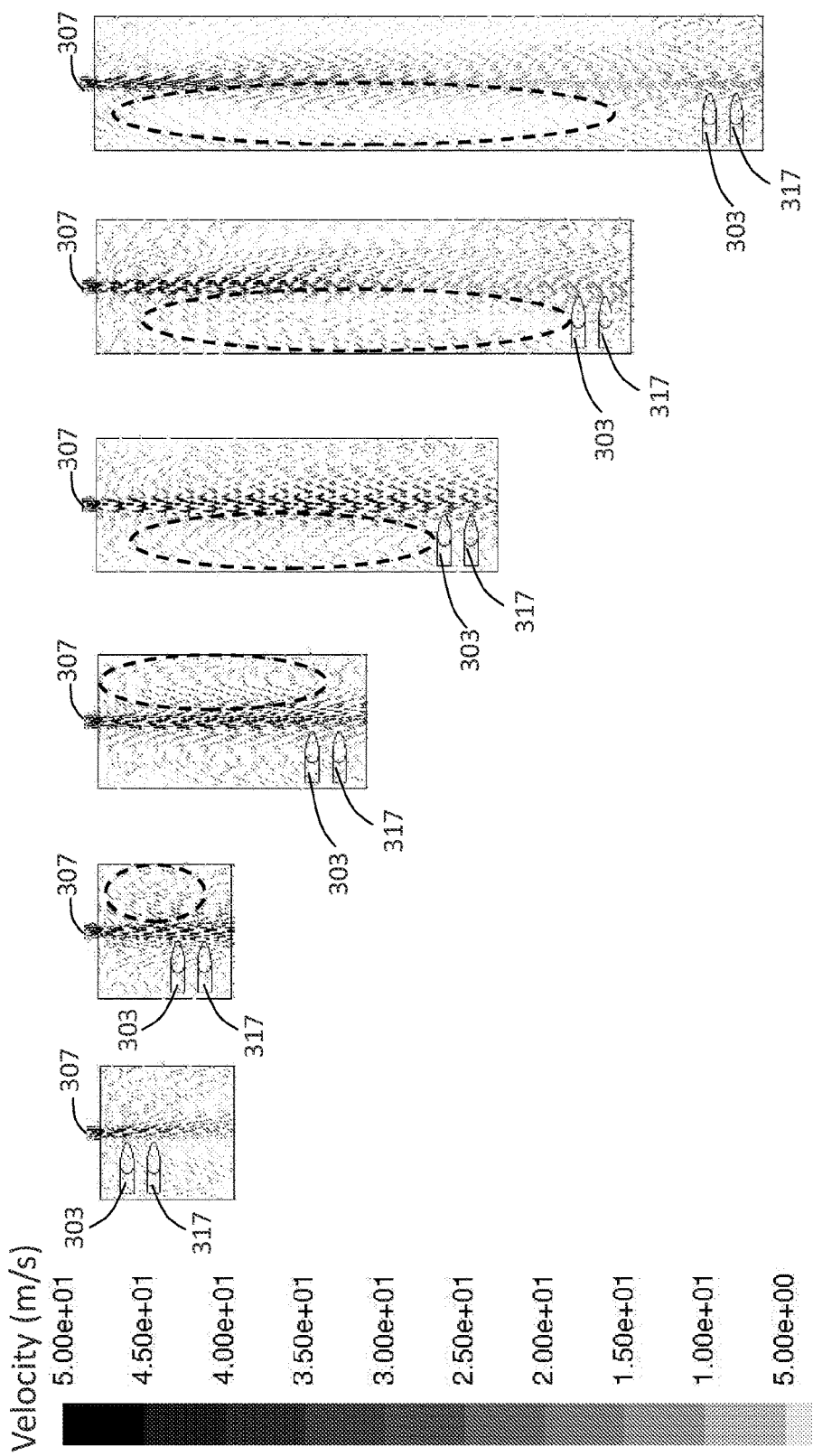
FIG. 21 is a drawing of CFD results comparing the effect of the geometric parameter $X_{pf}/D_{ic}$ on the velocity field of the inventive system depicted in FIG. 3.

The velocity profiles of FIG. 21 further extend the understanding of how the coupling between the axial ignition oxygen and the tangential primary fuel stream varies with $X_{pf}/D_{ic}$. The region of the organized recirculating flow structure between the front wall 308 and the location of primary fuel injection is highlighted by a dashed ellipse. It is noted that for $X_{pf}/D_{ic}$ between 0.6 and 3.7, the ORFS extends essentially the full distance between the two critical endpoints. However, for $X_{pf}/D_{ic}$ equal to 4.7, the ORFS does not fully extend downward to the point of tangential primary fuel injection. This is both because the region of influence of the suction generated by the ignition oxygen stream has reached its limit and because the ignition oxygen stream has progressively expanded radially outward toward the side wall of the ignition chamber, effectively preventing fluid communication between the two streams.

Figure 22:
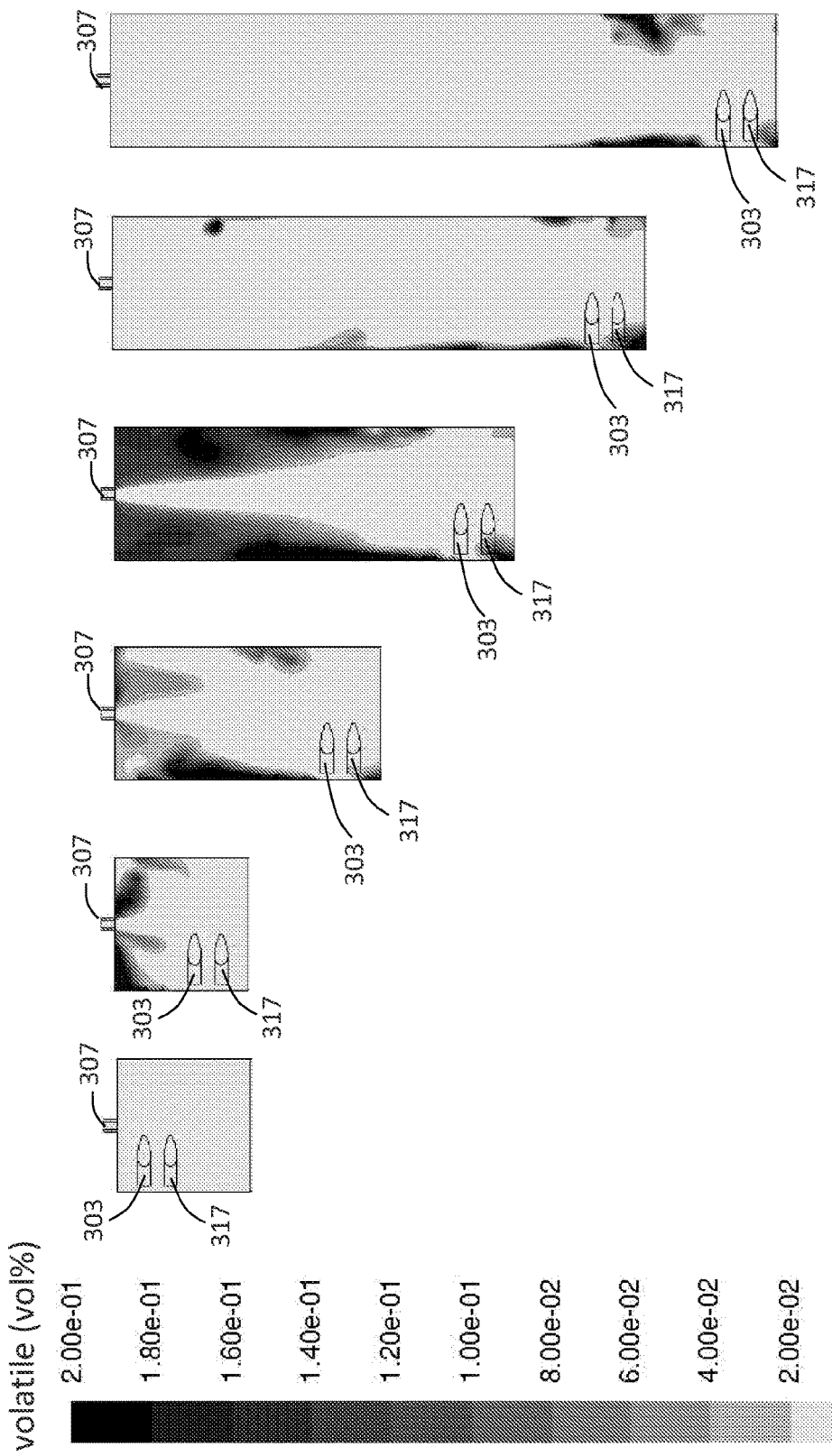
FIG. 22 is a drawing of CFD results comparing the effect of the geometric parameter $X_{pf}/D_{ic}$ on the volatile gas field of the inventive system depicted in FIG. 3.
Figure 23:
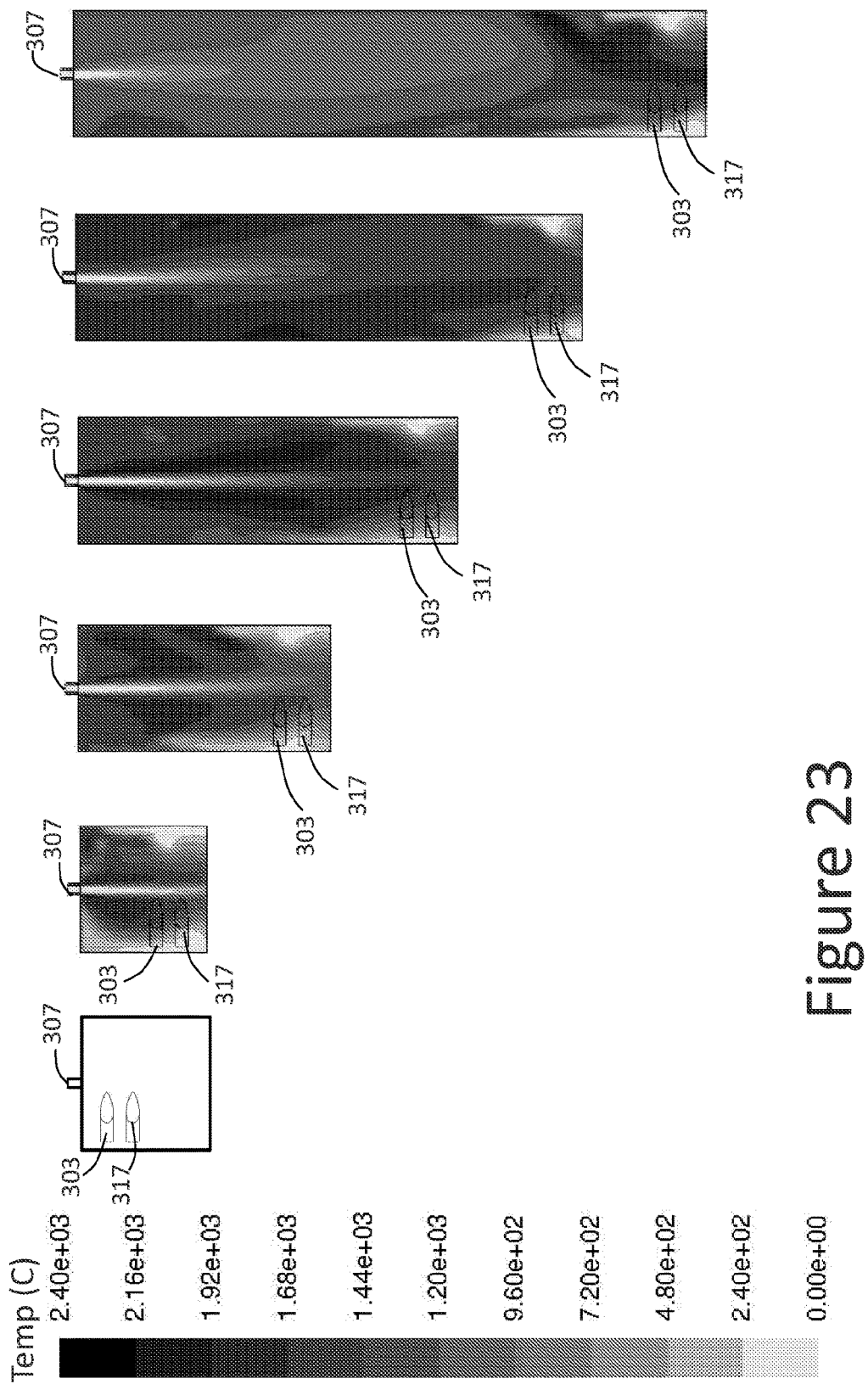
FIG. 23 is a drawing of CFD results comparing the effect of the geometric parameter $X_{pf}/D_{ic}$ on the temperature field of the inventive system depicted in FIG. 3.

The net effect on volatile release and chamber temperature over the range of $X_{pf}/D_{ic}$ is illustrated in FIGS. 22 and 23. Volatile release is shown to progressively increase up to a value of $X_{pf}/D_{ic}$ equal to 2.7, and begins to diminish thereafter. Chamber temperature, particularly around the ignition oxygen jet, also increases up $X_{pf}/D_{ic}$ equal to 2.7, indicative of strong combustion between volatiles and ignition oxygen. For $X_{pf}/D_{ic}$ equal to 3.7, there is still sufficiently high temperature due to the high particle residence time afforded by the ORFS and the extended chamber length. However, when $X_{pf}/D_{ic}$ is increased to 4.7, the temperature clearly begins to diminish to the aforementioned breakdown of fluid communication between the ignition oxygen and primary fuel jets.

Based on the modeling results and analysis, the upper range of the geometric parameter $X_{pf}/D_{ic}$ is limited to a maximum value of about 4.0.

Having described the reason for the unexpected performance of the inventive system in terms of the special arrangement and relationship among the ignition chamber, the ignition oxygen stream and the tangential primary fuel stream, as well as the limits imposed thereupon, we now proceed to Example 2, which illustrates the advantages of using oxygen, as opposed to air, in the ignition oxygen stream 309, for the efficient functioning of the inventive system.

Example 2

The flow rates and geometry of the inventive system in this example are identical to that of Configuration "B" of Example 1. Configuration "B" is used as the base case, with Configuration "C" shown for comparative purposes. Configuration "C" is identical to Configuration "B" except that the ignition and secondary streams are air instead of oxygen. We emphasize here that the secondary stream, in that it is introduced into the system via secondary injector 317 beneath the primary fuel injector 303, is not of critical importance in the establishment of the ORFS and, by extension, stable ignition within the ignition chamber 301. Rather, as previously stated, the results discussed in this Example are attributed to the difference in ignition oxidizer; the secondary oxygen is principally used to strengthen the centrifugal flow field (beneath the primary fuel stream within the ignition chamber 301) and to moderate the progression of combustion and, hence, temperature between the point of primary fuel injection and the outlet of the fuel nozzle.

Figure 24:
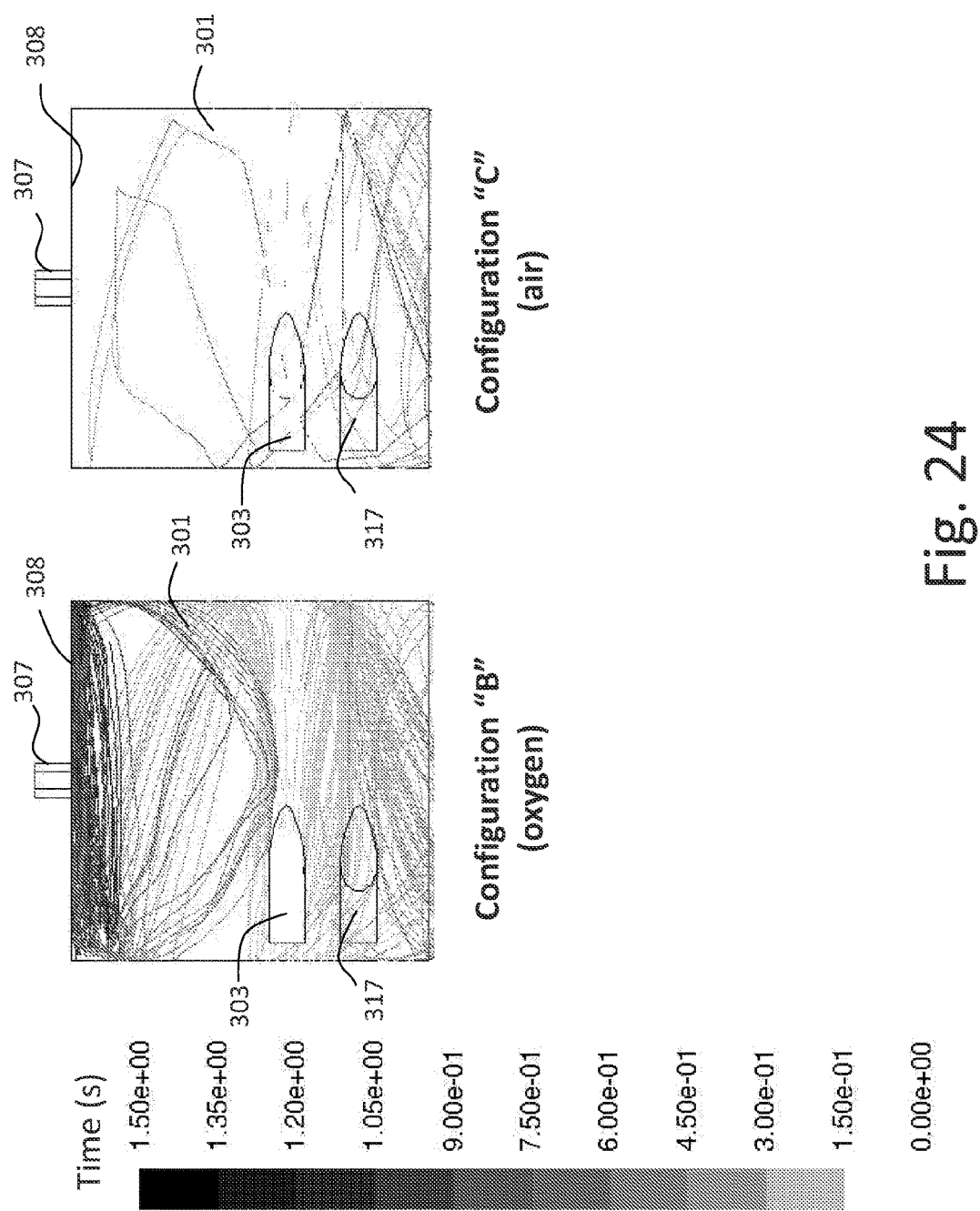
FIG. 24 is a drawing of CFD results comparing particle tracking of Configurations "B" and "C" of Example 2.
Figure 25:
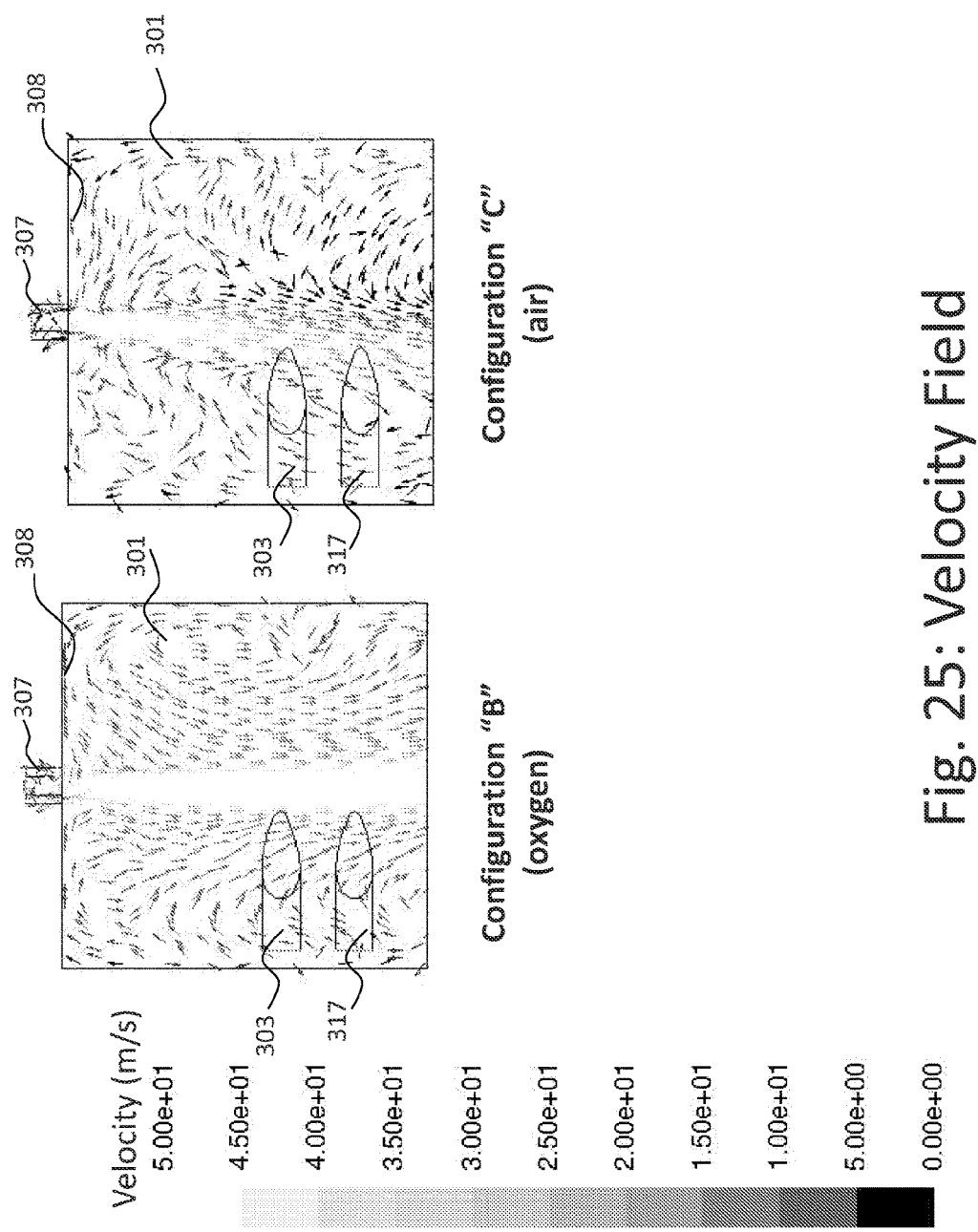
FIG. 25 is a drawing of CFD results comparing velocity fields of Configurations "B" and "C" of Example 2.
Figure 26:
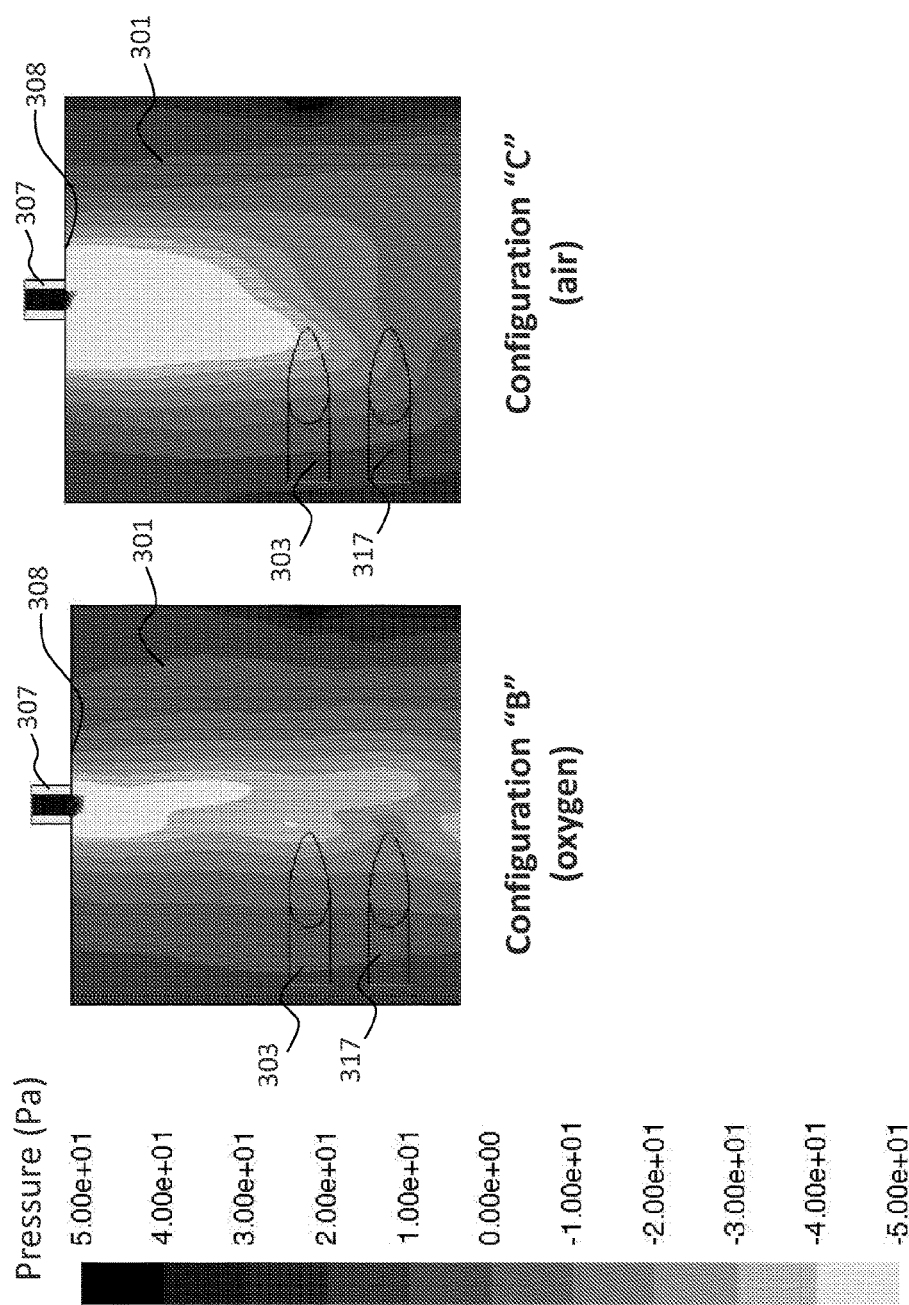
FIG. 26 is a drawing of CFD results comparing pressure fields of Configurations "B" and "C" of Example 2.

The first notable finding in comparing the oxygen-enriched Configuration "B" with the comparable air version of Configuration "C" is in the particle tracking and residence time plots of FIG. 24. Although the flow rates and velocities are identical between the two cases, neither the extent of upward particle migration nor the maximum residence time of the air case are substantially lower than that of the oxygen-enriched equivalent. We begin the root cause analysis with the velocity field comparison of FIG. 25. This figure shows that, in spite of identical reactant geometry and inlet velocity of the two cases, the central jet of Configuration "B" is characterized by high velocity and deep penetration into the ignition chamber 301 relative to Configuration "C". And, the flow recirculation between the ignition air stream and the tangential primary fuel injection in the air case of Configuration "C" is very weak and poorly organized relative to aforementioned ORFS of Configuration "B". However, when we assess the relative pressure field for the two cases in FIG. 26, it is noted that both Configuration "B" and "C" have qualitatively similar pressure contours, at least with respect to the location of the high pressure region. So, in contrast to Example 1 where it was deduced that the location of the high pressure region was a key factor in controlling the fluid mechanics between Configuration "A" and "B", the pressure field is not a differentiating factor between Configuration "B" and "C". This suggests that a root cause for the different particle migration characteristics of Configurations "B" and "C" is the oxygen concentration of the respective oxidizers. To prove this requires assessment of the combustion properties of the two configurations.

Figure 27:
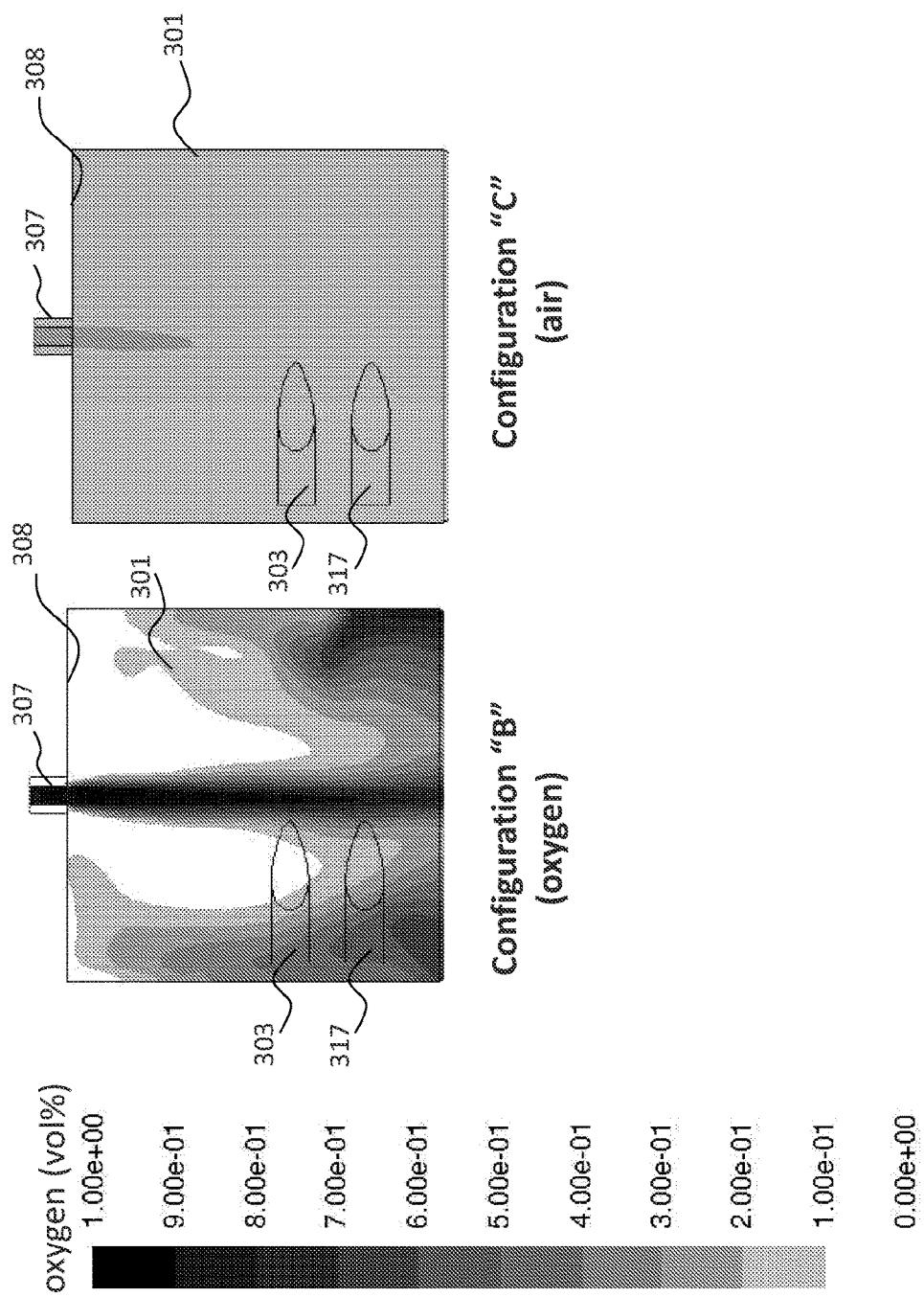
FIG. 27 is a drawing of CFD results comparing oxygen concentration profiles of Configurations "B" and "C" of Example 2.
Figure 28:
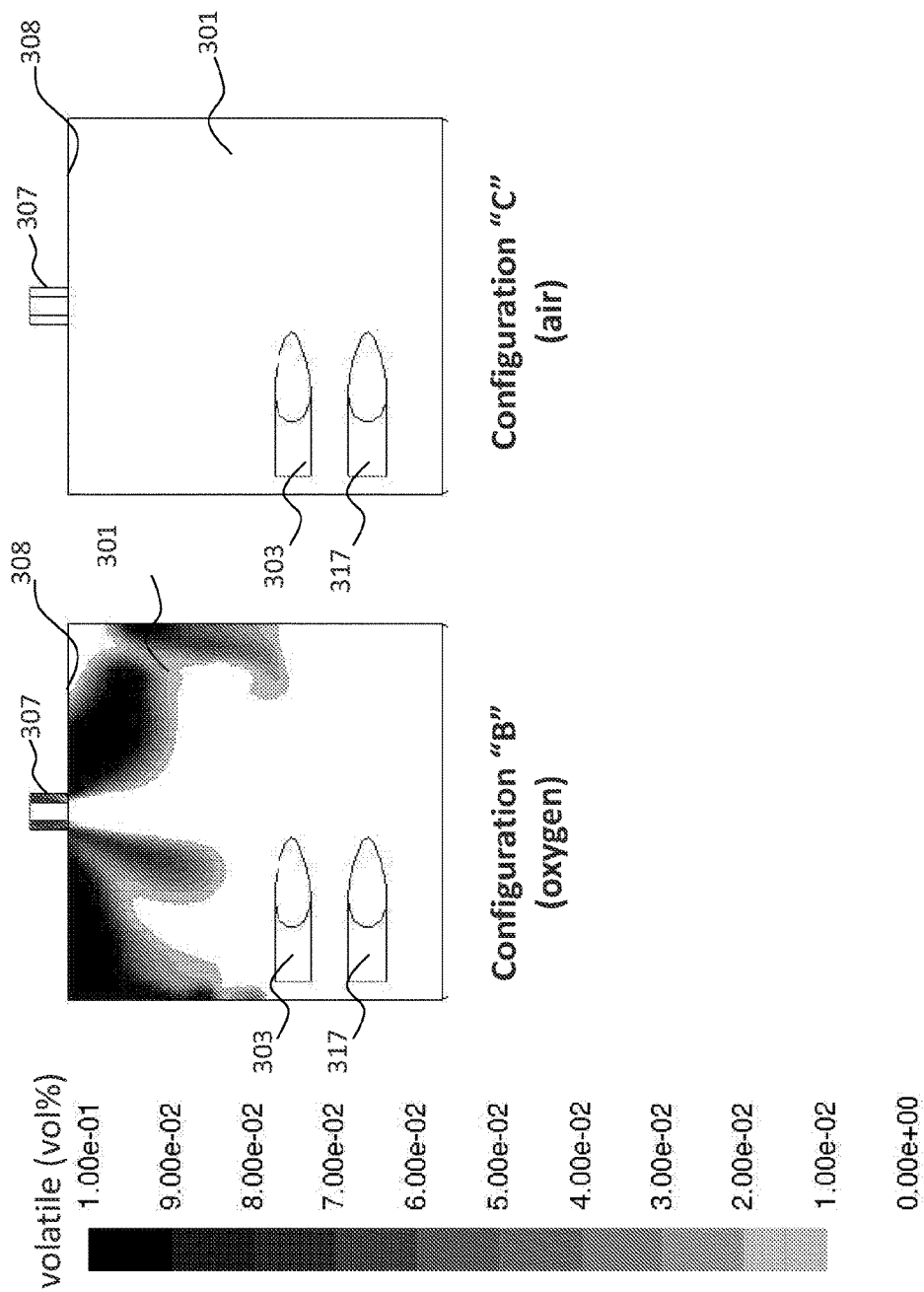
FIG. 28 is a drawing of CFD results comparing volatile gas fields of Configurations "B" and "C" of Example 2.
Figure 29:
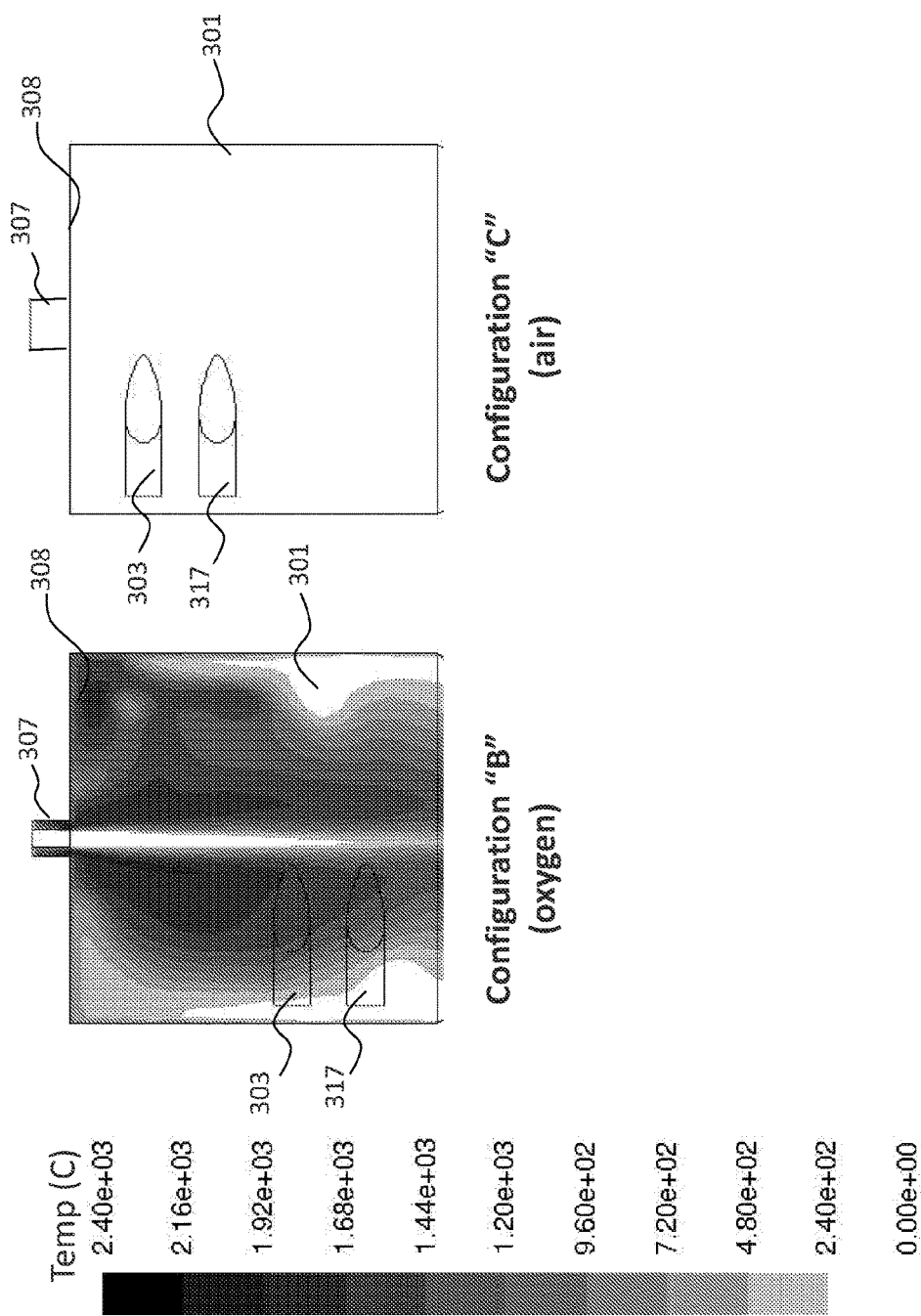
FIG. 29 is a drawing of CFD results comparing temperature fields of Configurations "B" and "C" of Example 2.

FIG. 27 gives the contours of oxygen concentration for the two exemplary configurations. We note that Configuration "B" displays a very high oxygen concentration along the main vertical axis where the ignition oxygen is injected, and that this high oxygen region gradually diminishes in both the radial and streamwise directions. This gradual diminishment of oxygen in Configuration "B" is due to the combined effect of diffusion (mixing) and consumption through combustion of volatile matter and fuel particulate. By contrast, the air case of Configuration "C" indicates constant oxygen concentration of nominally 21 vol % throughout the chamber, indicative of the absence of volatilization and chemical reaction. This assertion is confirmed in FIGS. 28 and 29 which show, respectively, the volatile concentration and temperature profile in the ignition chamber for the two configurations. We see clearly that significant volatiles evolution occurs in Configuration "B" with oxygen, particularly in the region around the ignition oxygen injection point, while none occurs in Configuration "C" with air. Hence, it is evident that, in Configuration "B", combustion occurs between the volatiles, solid particles and oxygen leading to the formation of a flame forming at the boundaries of the ignition oxygen jet (as noted by the temperature profile), whereas no reaction occurs in Configuration "C", in which temperatures throughout the chamber are equal to that of the injected streams (nominally 20 degrees C.). As in the comparison of Configurations "A" and "B" in Example 1, the expansion of gases resulting from the high temperature combustion taking place along the central axis of Configuration "B" generates the higher velocity of the central oxygen ignition jet and its deeper penetration into the ignition chamber relative to Configuration "C", and augments the fluid and fuel particle entrainment capacity of the jet, and the stability of the ORFS.

Summarizing the findings of Example 2, the presence of oxygen, i.e., an oxidant stream with greater than 30 vol % $O_2$, particularly ignition oxygen from ignition oxygen injector 307, is shown to be an important element of the inventive system. While the motive fluid mechanical forces associated with the central ignition oxidizer (oxygen vs. air) and the tangential primary fuel injection are identical for the two configurations of Example 2, the presence of oxygen acts to unlock, as it were, and amplify the advantageous properties of the system in the following manner: Following the initial heat-up period required for initiation of reactions, an organized recirculating is set up bringing volatile matter and fine particulate into the vicinity of the ignition oxygen stream. The salient property of the ignition oxygen stream 309 that catalyzes the precombustor system 300 performance is the ability to accelerate combustion reactions. Hence, volatile and fine particulate combustion readily occur when brought into contact with the ignition oxygen, releasing chemical energy, which is manifested in the increase of chamber temperatures, the subsequent expansion of gases and, hence, the strength of the central jet. The stronger central jet (relative to the air case) strengthens the motive force needed to propel the product gases and fine particulate from the plane of primary fuel injection upward to the region of suction generated at the base of the ignition oxygen jet, thereby perpetuating the required sequence of events. By contrast, the absence of the property of accelerating combustion reactions in the case of air breaks the necessary chain of events by failing to enable ignition and gas expansion, thus leading to the extinguishing of all chemical reactions.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A precombustor system comprising:
an ignition chamber having a front wall, a central axis, a diameter $D_{ic}$, and an outlet configured to discharge a product gas, the ignition chamber comprising:

a central ignition oxygen injector configured to inject a first oxygen stream from the front wall substantially parallel to the central axis, wherein the central ignition oxygen injector terminates at the front wall, and a tangential primary fuel injector configured to inject a primary fuel stream tangential to the central axis at a location an axial distance $X_{pf}$ downstream of the front wall, wherein the ratio $X_{pf}/D_{ic}$ is from 0.25 to 4.0, the central axis forms an angle $\alpha$ with a vertical line and the magnitude of the angle $\alpha$ is less than or equal to about 45 degrees, and the trajectory of the primary fuel stream forms an angle $\Theta$ with a plane that is perpendicular to the central axis and the magnitude of the angle $\Theta$ is less than or equal to about 20 degrees.

2. The system of claim 1, wherein the ratio $X_{pf}/D_{ic}$ is from 0.5 to 3.0.

3. The system of claim 1, wherein the ratio $X_{pf}/D_{ic}$ is from 1.5 to 3.0.

4. The system of claim 1, further comprising a secondary oxygen injector configured to tangentially inject a secondary oxygen stream into the ignition chamber at a location at a greater distance from the front wall than the tangential primary fuel injector.

5. The system of claim 1, further comprising a secondary injector configured to inject a secondary oxygen stream injected tangentially into the ignition chamber at a location approximately the same distance from the front wall as the primary fuel stream.

6. The system of claim 1, further comprising a secondary oxygen injector configured to tangentially inject a secondary oxygen stream into the ignition chamber at a location at a greater distance from the front wall than the tangential primary fuel injector and an additional secondary oxygen injector configured to inject an additional secondary oxygen stream injected tangentially into the ignition chamber at a location approximately the same distance from the front wall as the primary fuel stream.

7. The system of claim 1, further comprising a primary oxygen injector in a concentric arrangement with the tangential primary fuel injector to inject oxygen around the tangential primary fuel injector.

8. The system of claim 1, further comprising a transitional section downstream of the ignition chamber and an injection nozzle whose inlet is in fluid communication with the outlet, the outlet being configured to inject product gas and unburned fuel into a boiler or furnace.

9. The system of claim 8, wherein the inlet of the injection nozzle receives the product gas and unburned fuel from a vertical trajectory and directs the product gas and unburned fuel at a trajectory that is within 45 degrees of a horizontal line and discharges the product gas and unburned fuel into the furnace or boiler.

10. The system of claim 1, further comprising an outer oxygen stream surrounding the outlet.

11. The system of claim 1, further comprising a combustion air stream configured to mix and react with the product gas and unburned primary fuel in a boiler or furnace to complete combustion of said product gas and unburned primary fuel.

12. The system of claim 1, further comprising a pilot fuel injector configured to inject a pilot fuel into the injection chamber from the front wall substantially parallel to the central axis, wherein the pilot fuel is injected into the chamber adjacent the central ignition oxygen injector.

13. The system of claim 1, further comprising a pilot fuel injector configured to inject a pilot fuel into the injection chamber from the front wall substantially parallel to the central axis, wherein the pilot fuel injector and the central ignition oxygen injector are in a concentric arrangement.

14. The system of claim 1 wherein the angle $\alpha$ is less than or equal to about 30 degrees.

15. A method for combustion comprising:
providing an ignition chamber having a front wall, a central axis, a diameter $D_{ic}$, and an outlet configured to discharge a product gas, injecting a first oxygen stream from the front wall substantially parallel to the central axis from a central ignition oxygen injector, wherein the central ignition oxygen injector terminates at the front wall, and injecting a primary fuel stream tangential to the central axis at a location an axial distance $X_{pf}$ downstream of the front wall from a tangential primary fuel injector, wherein the ratio $X_{pf}/D_{ic}$ is from 0.25 to 4.0, the central axis forms an angle $\alpha$ with a vertical line and the magnitude of the angle $\alpha$ is less than or equal to about 45 degrees, and the trajectory of the primary fuel stream forms an angle $\Theta$ with a plane that is perpendicular to the central axis and the magnitude of the angle $\Theta$ is less than or equal to about 20 degrees.

* * * * *